United States Patent
Shen et al.

(10) Patent No.: US 7,397,911 B2
(45) Date of Patent: Jul. 8, 2008

(54) AUTOMATION OF CUSTOMER PREMISES EQUIPMENT PROVISIONING IN A TELECOMMUNICATIONS NETWORK

(75) Inventors: Fong Fang Shen, San Jose, CA (US); Yen-Huoy Yang, Los Altos, CA (US); Piu Piu Ong, Pleasanton, CA (US); Esther Sheu Sun Poon, Fremont, CA (US)

(73) Assignee: Cisco Technology, Inc., San Jose, CA (US)

( * ) Notice: Subject to any disclaimer, the term of this patent is extended or adjusted under 35 U.S.C. 154(b) by 194 days.

(21) Appl. No.: 11/201,800

(22) Filed: Aug. 10, 2005

(65) Prior Publication Data
US 2006/0050862 A1 Mar. 9, 2006

Related U.S. Application Data

(63) Continuation of application No. 09/884,416, filed on Jun. 18, 2001, which is a continuation-in-part of application No. 09/863,728, filed on May 22, 2001, now Pat. No. 6,879,679.

(51) Int. Cl.
*H04M 7/00* (2006.01)
*H04M 3/42* (2006.01)
(52) U.S. Cl. ................. 379/219; 379/201.03; 455/414.1
(58) Field of Classification Search ................. 379/219, 379/201.03; 455/414.1
See application file for complete search history.

(56) References Cited

U.S. PATENT DOCUMENTS

| 6,061,650 | A | 5/2000 | Malkin et al. |
| 6,553,568 | B1 | 4/2003 | Fijolek et al. |
| 6,584,186 | B1 * | 6/2003 | Aravamudan et al. .. 379/201.03 |
| 6,622,016 | B1 * | 9/2003 | Sladek et al. ............ 455/414.1 |
| 6,636,505 | B1 | 10/2003 | Wang et al. |
| 6,765,918 | B1 | 7/2004 | Dixon et al. |
| 6,798,751 | B1 | 9/2004 | Voit et al. |
| 6,829,250 | B2 | 12/2004 | Voit et al. |

* cited by examiner

*Primary Examiner*—Thjuan K. Addy
(74) *Attorney, Agent, or Firm*—Hickman Palermo Truong & Becker LLP

(57) ABSTRACT

A method to systematically analyze a next generation telecommunications network to result in creating a provisioning plan for provisioning the network to provide services for one or more subscribers. In one specific embodiment, the method involves creating and storing information that represents a logical decomposition of the next generation network into a plurality of discrete functional areas. The information representing the functional areas is analyzed to identify one or more provisioning requirements for each of the functional areas. One or more provisioning procedures are determined, and one or more required provisioning tools are identified for each of the functional areas, based on the provisioning requirements. A sequence of execution of the procedures and tools is created and stored as a provisioning plan.

33 Claims, 23 Drawing Sheets

Plain Old Telephone System 100

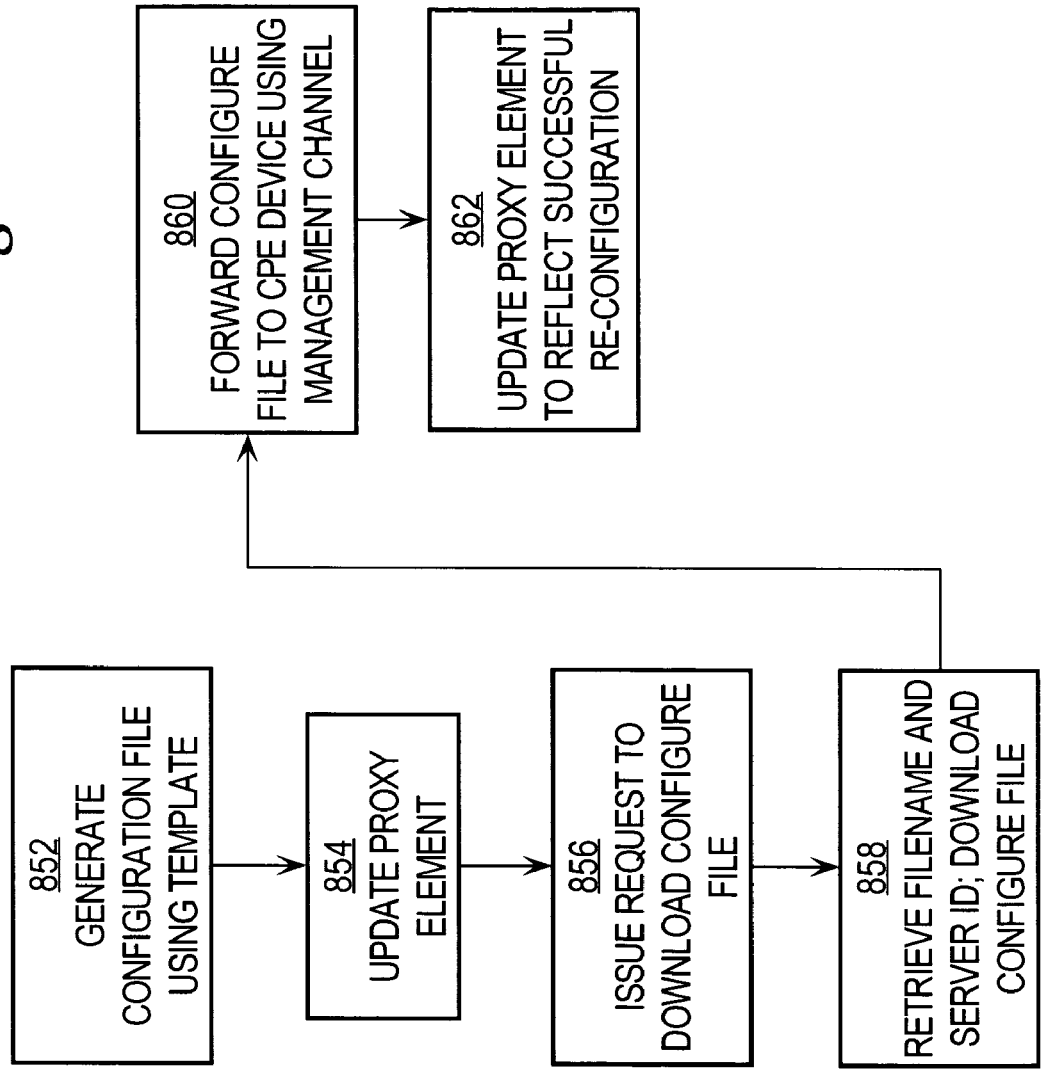

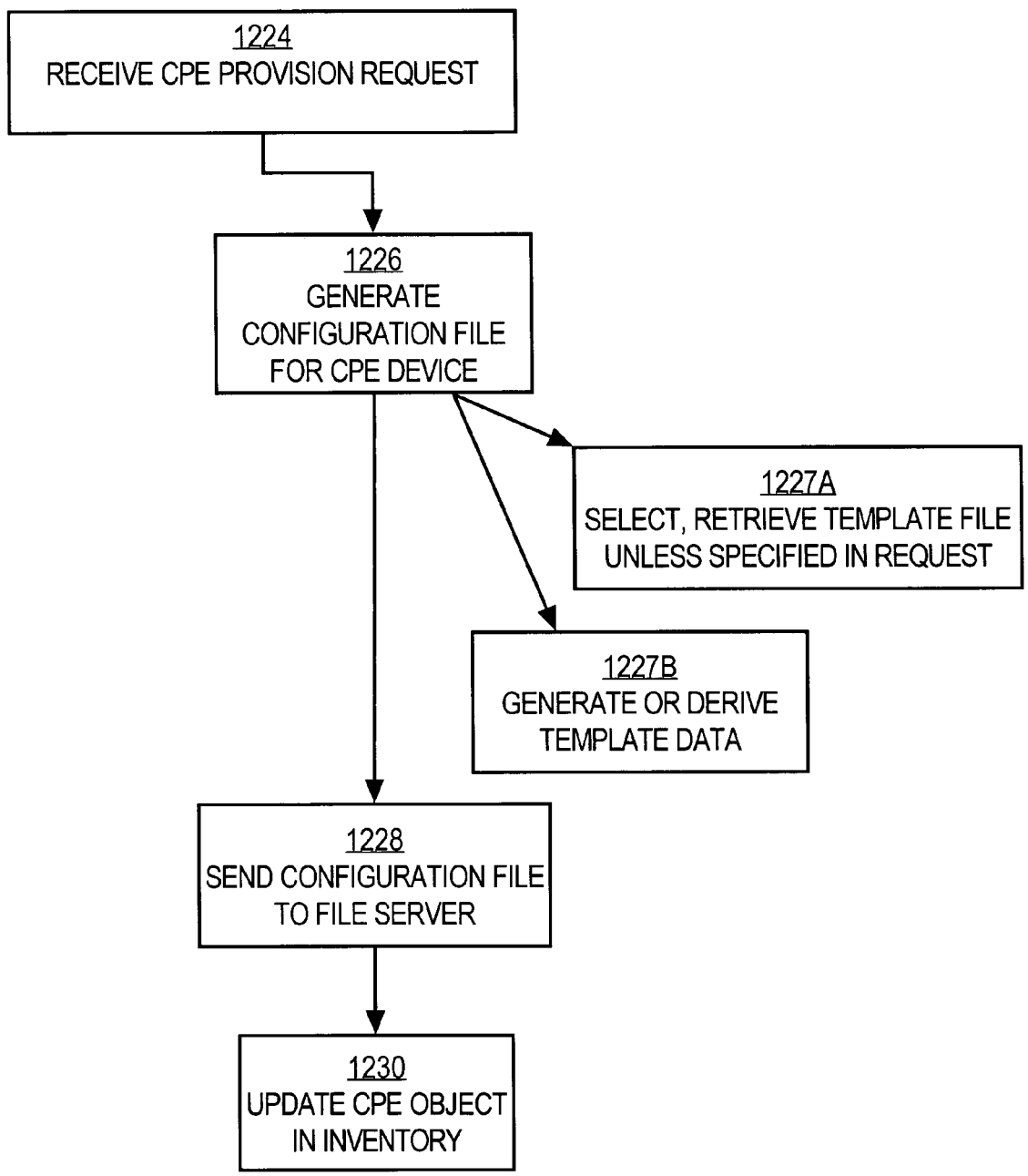

AUTOMATION OF CUSTOMER PREMISES EQUIPMENT PROVISIONING IN A TELECOMMUNICATIONS NETWORK

CROSS-REFERENCE TO RELATED APPLICATIONS; PRIORITY CLAIM

This application claims domestic priority under 35 U.S.C. §120 as a Continuation of U.S. application Ser. No. 09/884,416, filed Jun. 18, 2001, entitled Automation of Customer Premises Equipment Provisioning in a Telecommunications Network, which is a Continuation-in-part of U.S. application Ser. No. 09/863,728, filed May 22, 2001 now U.S. Pat. No. 6,879,679, entitled Analysis Method For Provisioning Subscribers In A Next Generation Telecommunications Network. The entire disclosures of each are hereby incorporated by reference as if fully set forth herein.

FIELD OF INVENTION

The present invention generally relates to provisioning customer premises equipment in a telecommunication network. The invention relates more specifically to a method and apparatus for automation of customer premises equipment provisioning in a telecommunications network.

BACKGROUND

The structure and function of telecommunications networks presently are undergoing remarkable change. The traditional circuit-switched telephone networks, also known as the public switched telephone network (PSTN) or Plain Old Telephone System (POTS), are undergoing replacement by heterogeneous networks that use numerous different digital communication protocols, hardware and other technologies. These new heterogeneous networks may use packet switching, Internet Protocol (IP), asynchronous transfer mode (ATM) switching, coaxial cable transmission, wireless links, and many other kinds of connections, equipment and interfaces. The new networks can carry data representing digital files, voice, video, and other media, and can provide multicasting and numerous other advanced services. Such networks are referred to herein as Next Generation Networks (NGN).

Both the POTS networks and NGNs use digital electronic equipment, computers and software for command, communication and control. One key difference between the architecture of the hardware and software in the POTS networks and NGNs is where intelligence is located in the network to deliver services and what kind of intelligence is provided. In a POTS network, processors that provide intelligence are centrally located, as in dedicated telephone company central offices. In contrast, in an NGN, intelligence is distributed across different devices in the network. Routers, switches, gateways, and related management software may be located in numerous locations, and network software providing command, control and communication may be located in any such device.

FIG. 1 is a block diagram of an example of a POTS network 100. In this example configuration, a centralized architecture has intelligence that is provided by one or more Class 5 (C5) switches 102A, 102B, a Service Control Point (SCP) 104, a Remote Digital Terminal (RDT) 106, and other nodes. Connections between a C5 switch 102A, 102B or RDT 106 and one or more subscriber telephones 112A are accomplished using copper wire. Each C5 switch is, for example, a No. 5 Electronic Switching System (5ESS) of the type first introduced by AT&T Bell Laboratories.

FIG. 2 is a block diagram of an example of an NGN 200. NGN architecture is quite different from POTS architecture. In particular, intelligence is distributed to many devices in the network, which may be geographically separated by large distances. In the example arrangement shown in FIG. 2, C5 switch 102A is coupled by copper wire connection 110 to a gateway 202, which is communicatively coupled to an Internet Protocol (IP) network 204.

A SCP 104 may also communicate with IP network 204 through PSTN 108 and a soft switch 206, which is communicatively coupled relatively directly to the IP network. The soft switch and the CPE connected over an IP network provide the functions of a POTS C5 switch. The gateway 202 and the CPE 212A provide the functions of a POTS RDT. In both cases, multiple devices distributed across the network participate in the processing and delivery of services.

Various other kinds of equipment and connections may be found in the NGN network 200. For example, IP network 204 may be connected through Digital Subscriber Line (DSL) device 210 to a Customer Premises Equipment (CPE) device 212A that services one or more workstations 216 or telephones 214. Workstations 216 may be personal computers, computer workstations, terminals, or other end station devices. Further, there may be a T1 connection 218 to a router 220 that services IP phones 214 or other workstations 216. As still another example, a cable gateway 224 may couple the IP network 204 to a cable system head-end facility 226. Signals from IP network 204 may also reach subscribers through the cable system by a communicative connection of cable gateway 224 to CPE 212B, which services one or more telephones 214, televisions 230, or other devices. Thus, in the example network of FIG. 2, CPE devices may access the NGN through cable, T1 and Digital Subscriber Line (DSL) links.

Each Customer Premises Equipment (CPE) device 212A, 212B is an intelligent device installed at the customer premises such as a residence, business facility, etc. Each CPE collaborates with other devices in the network 200 to deliver multiple services such as voice, video, and data connections to the Internet.

When an individual requests access to the POTS network for the first time, the owner or operator of the POTS network or other service provider is required to carry out numerous tasks. These tasks may be triggered by an individual moving to a new home, a business requesting an additional line to its premises, etc. Tasks for provisioning a new telephone subscriber may include a credit check, allocation of telephone number, updating 411 and 911 directories, creating subscriber information such as billing address, preferred long distance carrier, etc. These "back office" tasks are beyond the scope of this document, which focuses on the task to provision a subscriber on the network to activate voice service.

As part of deployment and maintenance of a POTS network, records are kept about copper loops owned by a service provider. In this context, the term "copper loop" refers to the infrastructure owned and maintained by an Incumbent Local Exchange Carrier ("ILEC," formerly known as the Regional Bell Operating Companies (RBOCs)), i.e., copper wires from CO or RDT to a termination point (residence, office, etc.). For example, when a subscriber calls his provider to order new service, the provider has information such as whether the house is wired for telephone service, and if it is, how many wall outlets, etc. Another example is if a service provider has information on which level of DSL services can be provided to a neighborhood, the service provider also knows how far the house is from the CO, quality of the "copper wires", etc., hence, what speed can be guaranteed to a potential DSL customer. Such information is used by service providers to process service and may be stored in one or more databases. When a customer places an order for service with the service provider, these records are used to determine if the service provider is physically able to provide service to the requested location. If service can be provided, the "back office" tasks are carried out. Thereafter, the service provider carries out network provisioning for the subscriber. Network provisioning operations may include provisioning the subscriber on the C5 switch and RDT, depending on how the copper loop is terminated in the Central Office (CO). Some network services may require provisioning the SCP through its Service Management System (SMS).

Provisioning subscribers in an NGN is significantly more complicated. As noted above, many different access methods can be used to connect CPE to the core network. Therefore, the network operator must verify that it has properly provisioned and installed physical network access points, such as DSL concentrators and cable gateways, that can serve subscribers before the subscribers are provisioned.

Provisioning NGN subscribers involves more than just provisioning the Soft Switch and the Gateway. If a subscriber is served by a Gateway, then the C5 switch that is associated with that Gateway also must be provisioned. Provisioning procedures also include provisioning subscribers on other network devices. Devices that have a role in the delivery of services to subscribers are touched when activating a service. These devices may be in the core network, at the access edge, and/or customer premises. As in a POTS network, some service orders may require provisioning SCP services through the SMS.

The requirements and procedures to provision a POTS subscriber are well defined and understood. This can be attributed to decades of experience in the management of POTS network. The nature of an architecture that is based on centralized management and processing of network services limits the requirements around a limited number of devices that need to be touched when provisioning a subscriber.

The distribution of intelligence to deliver service across network devices in an NGN that consists of CPE, access and core networks using different technologies has introduced new provisioning requirements, and the need for new procedures to fulfill these requirements.

In particular, provisioning CPE devices of NGN subscribers to deliver multiple services may require the configuration of the CPE device at the subscriber's usage location (e.g., home or office), access elements, and core network devices, depending upon the network technologies and the services that are being offered. In this context, "access elements" refers to devices located at a provider access point, and may include a DSLAM device in the case of DSL access, an aggregation router in the context of T1 access, a universal broadband router (UBR) in the case of cable technology, etc. Thus, the number of steps required to carry out successful provisioning is much greater in an NGN.

Further, the procedures for configuring various network devices are executed in a sequence that is determined in part by their inter-dependencies. Execution of such procedures can be done manually, which is a tedious, labor-intensive, and error-prone process. To compete for market share and increase profitability, service providers must build system that reduce administrative costs and accommodate rapid subscriber growth.

As shown in the NGN of FIG. 2, the possible permutation of CPE, access and core network technologies is not a small number. Offering multi-service packages, such as data and voice, further increases the level of complexity of this environment. Hence, the job to identify provisioning requirements is non-trivial.

Based on the foregoing, there is a need for a way to automate the provisioning process. There is a particular need for a way to automate the setup steps that are required to accurately provision CPE devices for NGN services, in a manner that is convenient, fast, and simple.

There is also a need for a way to provide automatic provisioning for "zero-touch" CPE devices so that little or no manual intervention is needed at the device in order to turn on services for a subscriber.

SUMMARY OF THE INVENTION

The foregoing needs, and other needs and objects that will become apparent for the following description, are achieved in the present invention, which comprises, in one aspect, a method to automate customer premises equipment provisioning in a next generation telecommunications network. In one specific embodiment, the method involves receiving a service request from a network service provider that specifies a service to be provided to the customer premises equipment. A configuration template for a configuration appropriate for the customer premises equipment is retrieved. Configuration data is automatically generated for the customer premises equipment based on the configuration template and stored system configuration information. The completed configuration data is automatically delivered over a local connection or over a network to the customer premises equipment to result in configuring the customer premises equipment to provide the service.

Embodiments are useful for configuring ADSL and T1 CPE devices in a voice-over-ATM network that uses Internet Protocol.

Other aspects and features of the invention and its embodiments will become apparent from the following description.

BRIEF DESCRIPTION OF THE DRAWINGS

The present invention is illustrated by way of example, and not by way of limitation, in the figures of the accompanying drawings and in which like reference numerals refer to similar elements and in which:

FIG. 8B is a flow diagram of a process of updating a configuration;

FIG. 12C is a flow diagram of other steps in a process of automatically provisioning a DSL CPE device.

DETAILED DESCRIPTION OF THE PREFERRED EMBODIMENT

Figure 1:
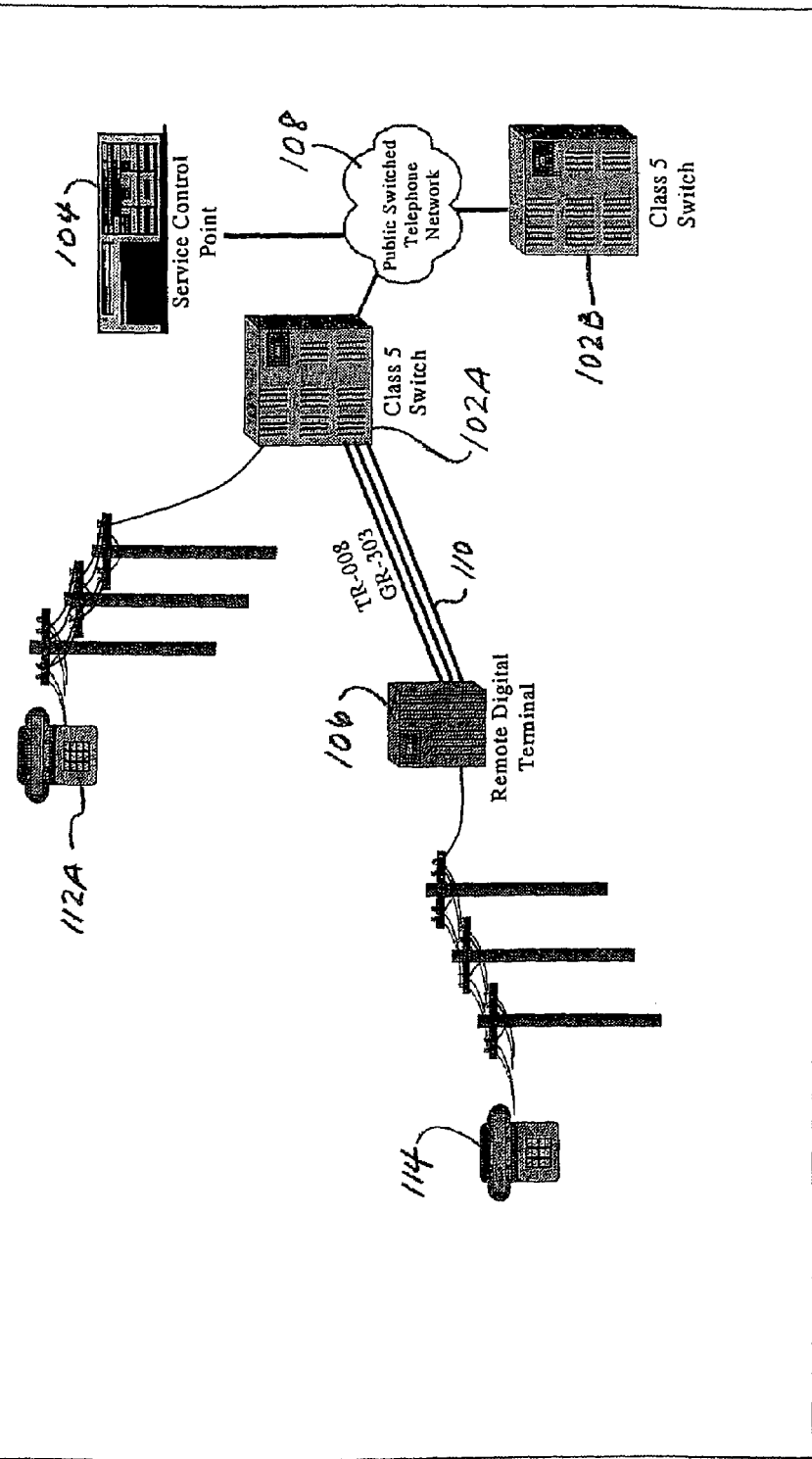
FIG. 1 is a block diagram that illustrates a simplified example of a POTS network.

According to one aspect, an analysis method for provisioning subscribers in a Next Generation Network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein in sections according to the following outline:

1.0 DEFINITIONS
2.0 ANALYSIS METHOD
   2.1 DECOMPOSE NETWORK AND PARTITION NETWORK INTO THREE MAJOR AREAS
   2.2 ANALYZE MAJOR AREAS AND IDENTIFY PROVISIONING REQUIREMENTS
   2.3 DEFINE PROCEDURE AND IDENTIFY TOOLS
   2.4 DEFINE SEQUENCE OF EXECUTION OF PROCEDURES AND TOOLS
3.0 AUTOMATED CPE PROVISIONING PROCESS IN GENERAL
   3.1 FUNCTIONAL OVERVIEW
   3.2 PROVISIONING NETWORK HARDWARE CONTEXT
   3.3 ARCHITECTURE OF CPE PROVISIONING SERVICE
   3.4 CPE PROVISIONING EXAMPLES
4.0 AUTOMATED CPE PROVISIONING APPROACH IN DETAIL
   4.1 NETWORK INVENTORY MANAGEMENT
   4.2 STATES AND STATE TRANSITIONS
   4.3 SERVICE REQUESTS
   4.4 PREPARATION FOR PROVISIONING
   4.5 PROVISIONING A DSL CPE DEVICE
   4.6 AUDIT TRAIL LOG AND LOG VIEWER
5.0 HARDWARE OVERVIEW
6.0 EXTENSIONS AND ALTERNATIVES

1.0 Definitions

Numerous acronyms and abbreviated terms are used in this document for brevity and convenience. The following definitions apply to such acronyms and terms. Such definitions are provided to enhance an understanding of the example embodiments that are illustrated herein. However, the invention is not limited to the definitions set forth herein and is not limited to using the defined terms, acronyms or abbreviations.

| ABBREVIATED TERM | DEFINITION |
| --- | --- |
| CPE | Customer Premises Equipment |
| DHCP | Dynamic Host Control Protocol |
| DNS | Domain Name Server |
| DSL | Digital Subscriber Line |
| EMS | Element Management System |
| FQDN | Fully Qualified Domain Name |
| IP | Internet Protocol |
| NGN | Next Generation Network |
| PPP | Point-to-Point Protocol |
| PSTN | Public Switched Telephone Network |
| PVC | Permanent Virtual Circuit |

2.0 Analysis Method

In one embodiment, an approach to manage the task of identifying requirements and defining procedures for the diverse network configurations found in next generation networks involves systematically decomposing an NGN and partitioning it into areas. Each area comprises a device or group of devices that provide similar or related functions in the network. Services to be delivered over these devices identify the roles of these devices in the different areas. Proper device settings, or provisioning requirements are identified, and used to drive the definition of procedures for each area. The sequence of execution of these procedures is determined by their interdependencies. The set of all procedures for these areas makes up the end-to-end procedure to provision NGN subscribers.

Figure 3:
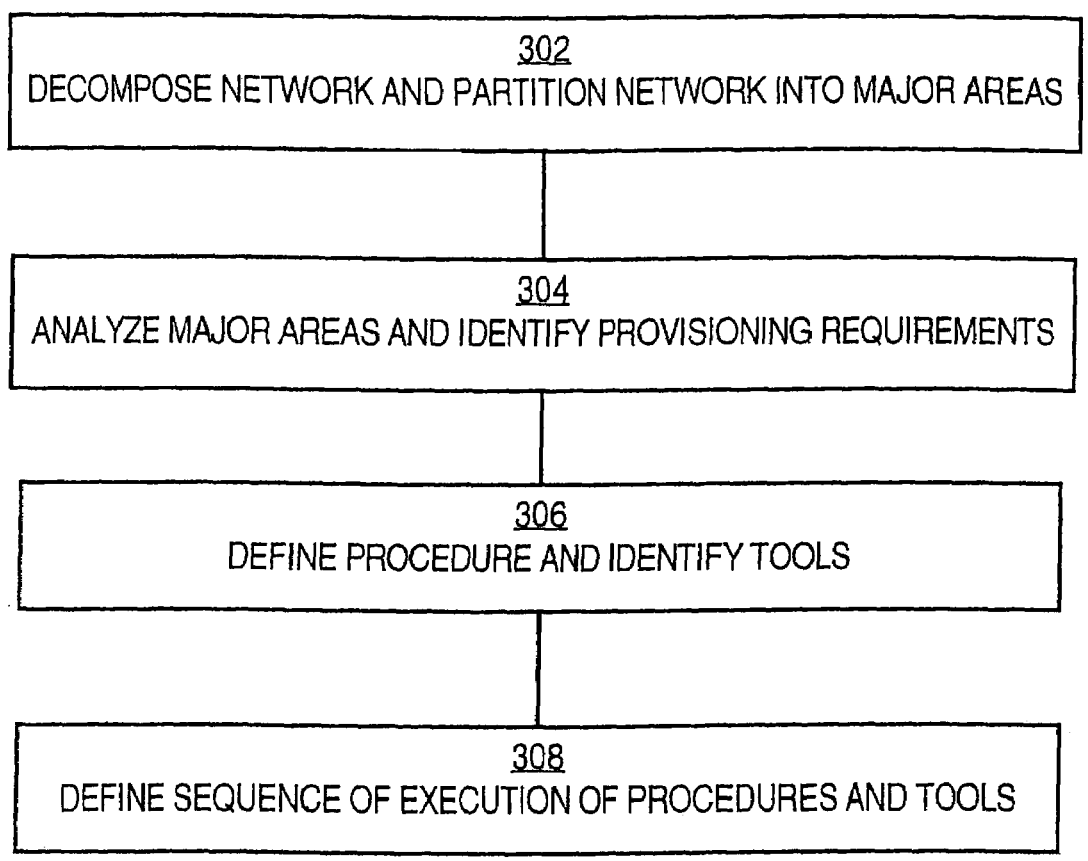
FIG. 3 is a flow diagram that illustrates one specific embodiment of an analysis method for provisioning subscribers in a next generation network.

FIG. 3 is a flow diagram that illustrates one specific embodiment of an analysis method for provisioning subscribers in a next generation network.

In block 302, the network is decomposed and partitioned into three major areas: Subscriber CPE, Access & Core Network, and Switch & Other Processors.

In block 304, each area is analyzed to identify provisioning requirements for the different services.

In block 306, based on provisioning requirements of each area, a provisioning procedure is defined, and tools are identified, if applicable.

Block 308 comprises determining a sequence of execution of steps in the procedure for each of the three areas to provision a subscriber.

The application of this analysis method is not limited to NGN for voice and data services. It can be applied to networks that provide other services such as video and home appliance control.

Steps of the foregoing method are now individually described in further detail.

2.1 Decompose Network and Partition Network into Three Major Areas

Figure 4A:
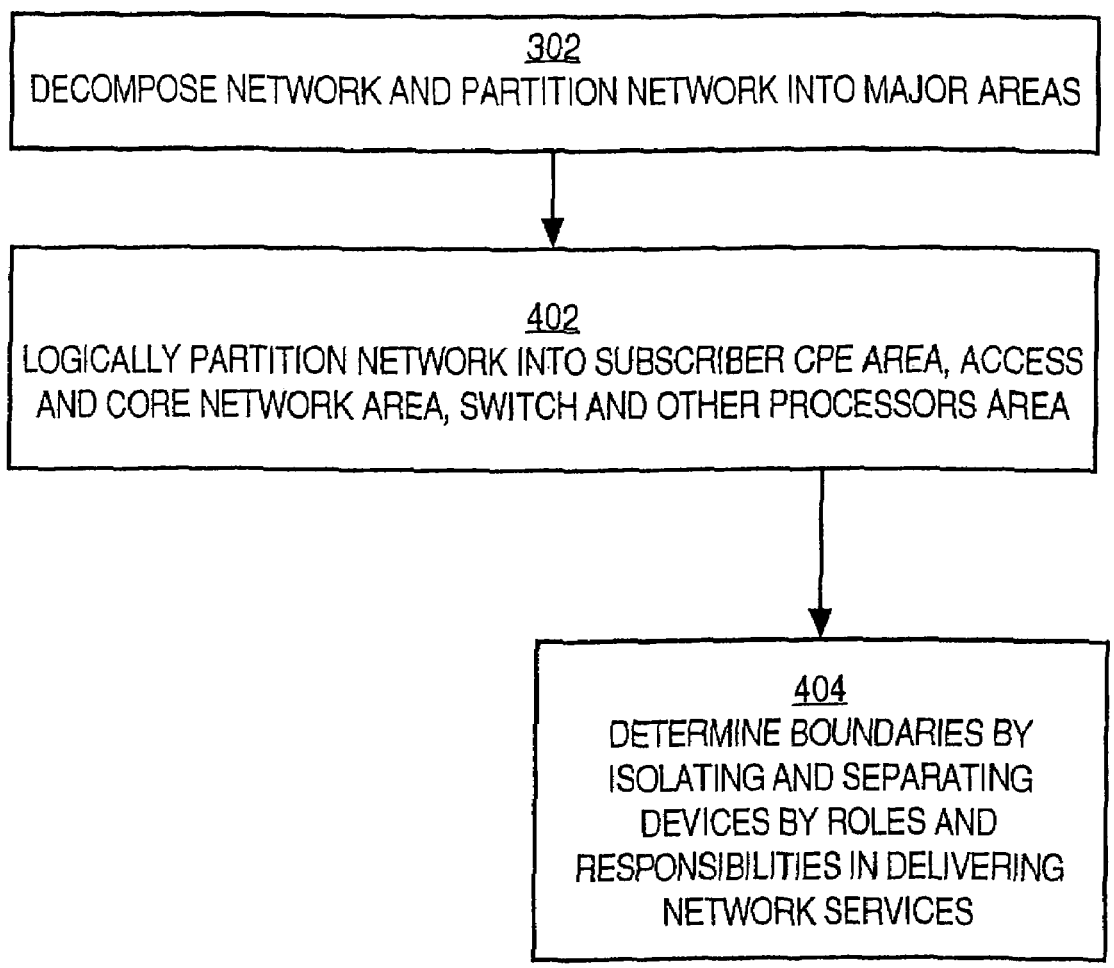
FIG. 4A is a flow diagram of sub-steps involved in certain steps of FIG. 3.

FIG. 4A is a flow diagram of sub-steps that may be used to carry out block 302 of FIG. 3.

Figure 2:
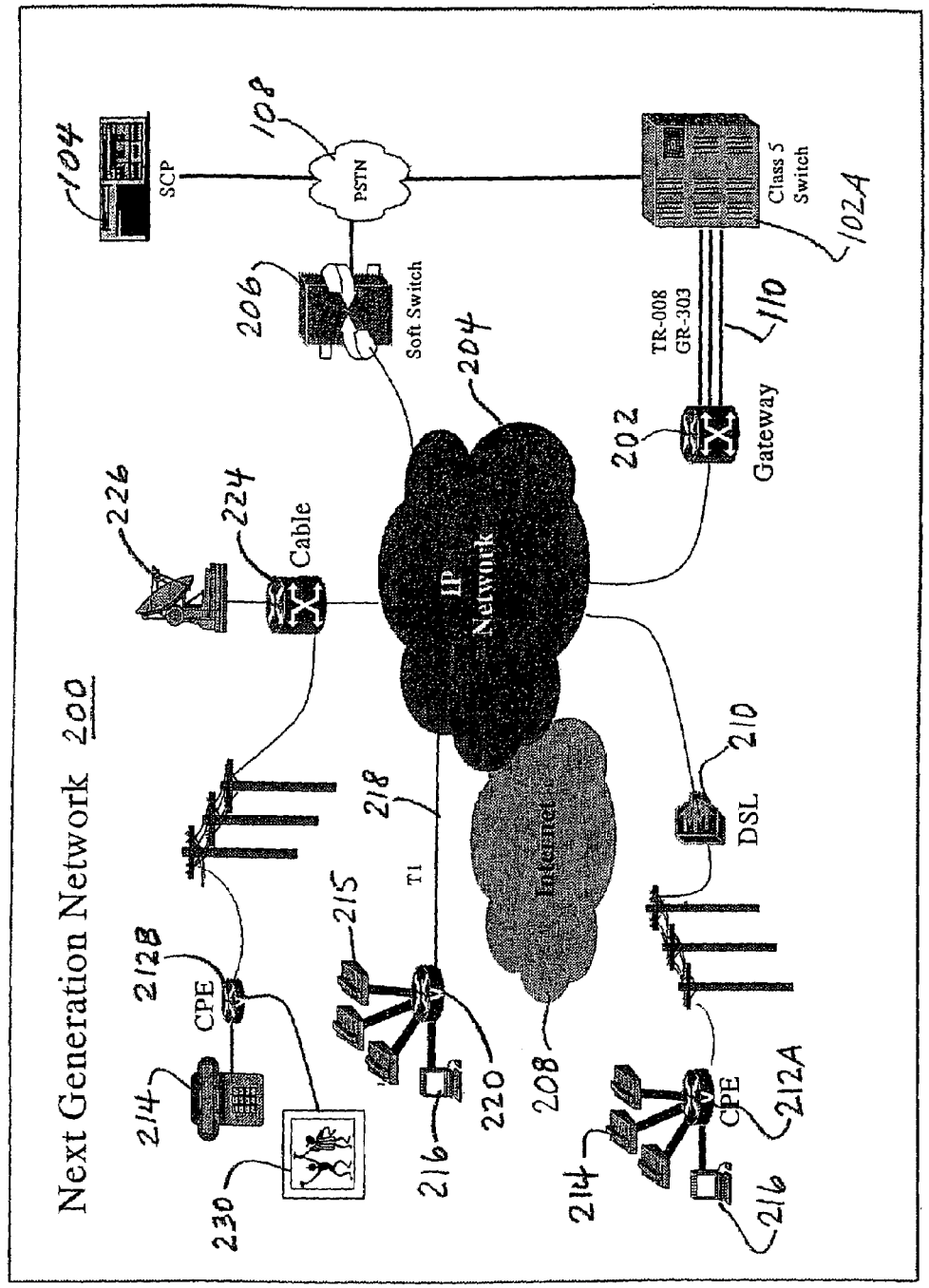
FIG. 2 is a block diagram that illustrates a simplified example of a next generation network.
Figure 4B:
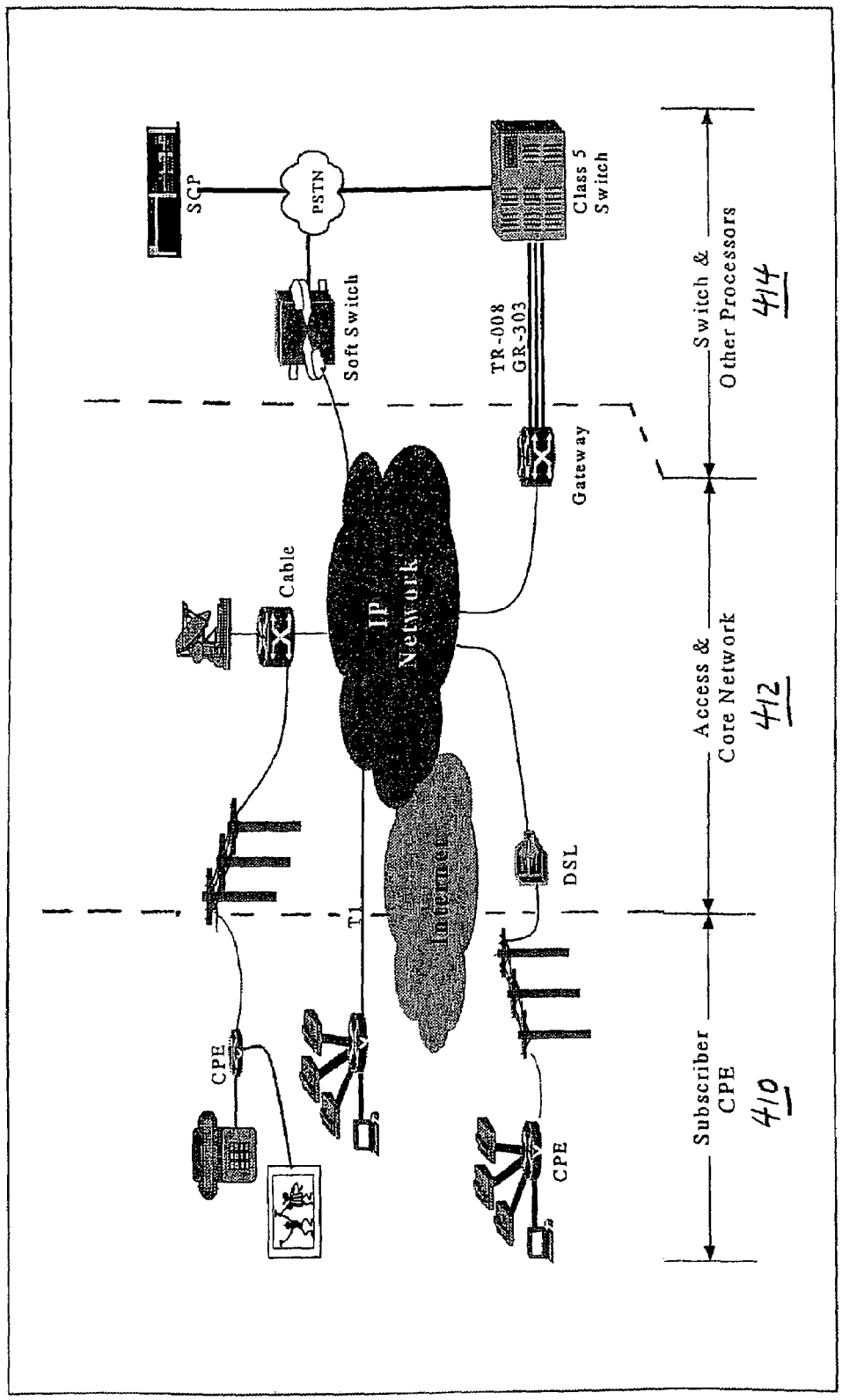
FIG. 4B is a block diagram illustrating how the NGN of FIG. 2 is partitioned into a subscriber CPE area, an access network and core network area, and a switch and other processors area.

In general, an NGN can be logically partitioned into three major areas. In one embodiment, the major areas comprise a subscriber CPE area, an access network and core network area, and a switch and other processors area, as indicated by block 402. FIG. 4B is a block diagram illustrating how the example NGN shown in FIG. 2 could be partitioned into a subscriber CPE area 410, an access network and core network area 412, and a switch and other processors area 414 using the approaches described herein.

As shown in block 404, the boundaries of these partitions are created to isolate and separate devices by their roles and responsibilities in delivering network services. Groupings of similar and/or related functions provided by devices in its own area facilitate the identification of provisioning requirements. Determining boundaries is generally carried out manually based on information about elements in the network and their functions.

Because network topology information or other information that classifies network devices by function is usually not readily available in an NGN, a manual method is preferred, and it is considered important to use a systematic approach to determine provisioning requirements and procedures for an NGN network.

Table 1 describes the functions of the devices in each of the three areas that may be used to make such determinations.

TABLE 1

FUNCTIONS OF DEVICES IN NETWORK AREAS

| Area(s) | Function(s) |
|---|---|
| Subscriber CPE | Network device at customer premise that collaborates with other NGN devices to deliver service(s) |
| Access Network and Core Network | Network devices at access edge and core that provide connectivity between subscriber CPE and other NGN devices |
| Switch and Other Processors | NGN components that provide network services to subscribers |

2.2 Analyze Major Areas and Identify Provisioning Requirements

Figure 5:
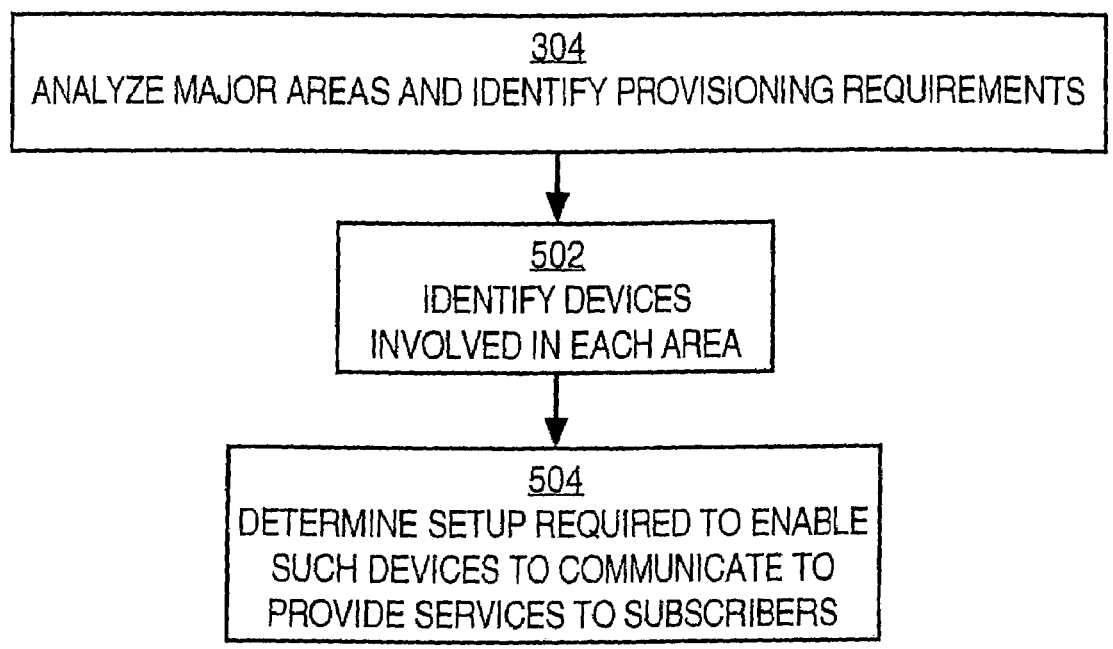
FIG. 5 is a flow diagram of sub-steps involved in certain steps of FIG. 3.

Block 304 of FIG. 3 involves analyzing the three major areas of the network and identifying provisioning requirements for each area. FIG. 5 is a flow diagram of sub-steps that may be carried out in one implementation of block 304 of FIG. 3.

In general, network design dictates how devices communicate, and their roles and responsibilities in the network to deliver services. Therefore, block 304 may involve analyzing the network and services to identify the devices involved, as shown in block 502 of FIG. 5. Further, a determination is made regarding a setup required to enable such devices to communicate with each other to provide services to subscribers on the network, as shown in block 504. Provisioning requirements for the three areas that define information such as individual device settings resulting from such analysis and determination is stored in a database to facilitate actual provisioning.

The partitioning of network into three functional areas facilitates a grouping of provisioning requirements for each area. At a high logical level, the provisioning requirements for the three areas are:

Subscriber CPE—configuration to enable a device to provide one or more subscribed services;

Access and Core Network—configuration for the devices at the edge of the access network and core network to provide connection between subscriber CPE and other network devices for subscribed services;

Switch and Other Processors—subscription information that includes a unique subscriber identifier, and subscribed services and required parameters.

Analyzing the role of each device in the delivery of service determines the provisioning requirements. This step in the analysis examines each service and steps through the network to identify the settings for each device that participate in the delivery of the service. For example, if a service design uses PVC to carry IP messages between CPE and Call Agent to set up a voice call, provisioning requirements for the three areas are:

For Subscriber CPE 220: settings to connect CPE to T1 circuit 218 (connection to network); PVC settings (use PVC to transport data); and IP interface (enable sending and receiving of IP messages from Call Agent).

For Access and Core Network 204: PVC settings on port where T1 circuit 218 is terminated (use PVC to transport data); and IP settings on port where T1 circuit 218 is terminated (enable transport of IP messages).

For Switch and Other Processors 206: IP settings for subscriber CPE 220 (enable sending and receiving of IP messages from CPE).

In this example, these device settings make up the provisioning requirements for voice service over T1 access. Table 2 summarizes the results of this analysis for delivering voice and data services over DSL. Other services over DSL access, and networks that use other access methods would have different provisioning requirements.

TABLE 2

| Area(s) | Provisioning Requirements |
|---|---|
| Subscriber CPE | 1. For Data Service:<br>a. Point-to-Point Protocol (PPP)<br>b. PVC for data traffic<br>2. For Voice Service:<br>a. IP address<br>b. Fully Qualified Domain Name (FQDN)<br>c. PVC for voice traffic and messaging with Soft Switch |
| Access and Core Network | 1. For DSLAM:<br>a. PVC to Internet gateway for data traffic (Data Service)<br>b. PVC to router for voice and messaging traffic (Voice Service)<br>2. For Router: (Voice Service)<br>a. PVC to DSLAM for voice and messaging traffic<br>b. Routing information for voice PVC<br>3. For Internet gateway: (Data Service)<br>a. PVC to DSLAM for data traffic |
| Switch and Other Processors | 1. For Soft Switch: (Voice Service)<br>a. Telephone numbers and mapping to IP address and port<br>b. Subscribed services<br>2. For RADIUS Server: (Data Service)<br>a. User profile |

2.3 Define Procedure and Identify Tools

When provisioning requirements are identified, the next step is to define the procedures to set up the device or group of devices in each of the three areas to activate service for the subscriber, as identified in block 306 of FIG. 3. This step includes understanding the information required to set up a device, and the tools available to perform this task. Steps in the procedure are not limited to configuring devices; such steps may involve obtaining device parameters from other system(s), e.g., IP Address and FQDN.

Using the same example of delivering voice and data service over DSL, the procedures include the steps shown in Table 3.

TABLE 3

PROCEDURAL STEPS AND TOOLS FOR PROVISIONING

| Area(s) | Steps | Tools & Other Systems |
|---|---|---|
| Subscriber CPE | Collect CPE parameters - IP Address FQDN Voice PVC Data PVC Username and password (Radius server entry) Create configuration file Load configuration file | DHCP server DNS server |
| Access & Core Network | Provision DSLAM - Data PVC to connect CPE to Internet gateway Voice PVC to connect CPE to router | Element Management System (EMS) |
| | Provision router - Voice PVC to DSLAM Routing information for voice PVC | EMS |
| | Provision Internet gateway - Data PVC to DSLAM | EMS |
| Switch & Other Processors | Provision Soft Switch - Subscriber information | EMS |
| | Provision Radius Server - Define user profile | EMS |

Each tool such as an EMS may provide different interfaces to perform a task. For example, an EMS may provide a GUI interface for a user to set up a device, or it may provide an electronic interface for another tool to deliver the required configuration parameters to the device through the EMS.

2.4 Define Sequence of Execution

Block 308 of FIG. 3 involves analyzing and resolving one or more inter-dependencies of the procedures for the three areas. Output of this analysis is a final order of execution of steps within the different procedures.

The sequence of steps for provisioning a DSL subscriber for voice and data service is summarized in Table 4.

TABLE 4

EXAMPLE SEQUENCE OF PROVISIONING STEPS

| Areas | Steps | Sequence | Comments |
|---|---|---|---|
| Subscriber CPE | Collect CPE parameters - IP Address FQDN Voice PVC Username and password Data PVC | 2 | Match DSLAM provisioning Match Radius server entry Match DSLAM provisioning |
| | Create configuration file | 3a | |
| | Load configuration file | 4 | |
| Access & Core Network | Provision DSLAM - Data PVC to connect CPE to gateway Voice PVC to connect CPE to router | 1a | |
| | Provision router - Voice PVC to DSLAM Routing information for | 3b | Match IP address assigned to CPE |

TABLE 4-continued

EXAMPLE SEQUENCE OF PROVISIONING STEPS

| Areas | Steps | Sequence | Comments |
|---|---|---|---|
| | voice PVC Provision Internet gateway - Data PVC to DSLAM | 1b | |
| Switch & Other Processors | Provision Soft Switch - Subscriber information | 3c | Match FQDN assigned to CPE |
| | Provision Radius Server - Define user profile | 1c | |

The sequence of execution is determined manually by understanding the dependencies of identified provisioning requirements. For example, subscriber IP information cannot be entered into the Soft Switch until it has been set up for CPE.

Steps that are labeled with letters indicate that there are no dependencies with respect to other steps that have the name number and different letters. Thus, such steps may be executed in parallel, or in any order. For example, steps 1a, 1b, and 1c may be executed in the order 1a-1c-1b, or in the order 1b-1a-1c.

Depending on the function of each step, and tools used to perform function, a step may consist of multiple steps. For example, entering and reviewing data in multiple EMS screens is required to provision PVC on the DSLAM. A procedure detailing all these steps defines the procedure to provision NGN subscribers.

An ordered sequence of execution steps with an identification of any associated required tools, of the type shown in Table 4, may be created and stored in any medium that is convenient, thereby resulting in creating and storing a provisioning plan for provisioning subscribers in the network. Using the foregoing process, diverse NGN configurations can be systematically analyzed to identify provisioning requirements for definition of procedures to provision subscribers. Execution of provisioning procedure may be performed manually, or automated depending on the capability of the tools and availability of Network Management System (NMS). NMS are computer applications that provide the function of automating operational procedures such as provisioning. Using such systems and applications, one or more commands, data, or other information are sent to all necessary devices in the NGN to result in provisioning services for a subscriber.

3.0 Automated CPE Provisioning Process in General 3.1 Functional Overview

According to an embodiment, a computer hardware/software system automates procedures involved in provisioning CPE devices. The provisioning system understands the procedure and sequence of execution of provisioning steps applicable to CPEs. Further, it interacts with CPEs, or related tools, using numerous delivery mechanisms for delivering final configuration data to the CPEs. As a result, CPE devices are automatically configured for NGN services in a rapid and efficient manner.

In this context, "CPE device" refers to any customer premises equipment that may benefit from an automated provisioning approach. Non-limiting examples of CPE devices include the Cisco 827 ADSL Router, the Cisco IAD 2420 Integrated Access Devices, the Cisco 3660 Series Multiservice Platform, Gigabit Ethernet interface devices for home or small office use, etc. The approaches disclosed herein are particularly beneficial when used in connection with CPE devices that are capable of using TFTP, FTP, or similar protocols for data transfer, or that incorporate a pre-configured HTTP client, or that can otherwise support event-based provisioning or HTTP/Web-based provisioning.

Approaches described herein may be implemented in the form of one or more computer programs, applications, or other software elements that are executed under the control or supervision of a telecommunications network service provider. For example, the processes may be embodied in software that runs on computers or workstations located at an operations center, data center, etc.

The following is a description of one specific embodiment of a method of provisioning CPE devices including steps to automatically accomplish a service request related to CPE provisioning.

A service request is received. For example, this involves receiving a service request from a order service system (OSS), customer care system or other software or hardware facility of a telecommunications service provider. A service request generally specifies whether the subscriber is requesting voice service, data service, the type of data service if any, quality of service parameters, etc. In general, embodiments described herein relate to service requests for network access service, such as DSL, or other access approaches that apply to the "last mile" of connection between a subscriber premises and a switching office or other facility of the telecommunications provider.

The service request is decomposed into a sequence of procedures or steps that further break down the provisioning procedure.

The procedures or steps that configure a CPE in the NGN for the desired services are executed.

The method notifies the OSS or service provider operator of the status of provisioning.

As an example, configuring a CPE in the NGN is achieved by first collecting one or more configuration parameter values, based on input from service request, and output from previous procedure/tasks.

A set of configuration data is generated. For example, a configuration file is created and stored, based on a template that corresponds to the device.

The configuration is delivered. The delivery mechanism that is used for a particular CPE depends on the auto-provisioning mechanism supported by that CPE. Examples of configuration delivery mechanisms that can be used include TFTP or FTP download, HTTP download from a Web server, a telnet connection that "pushes" a configuration file to the CPE device, etc. The provisioning system participates in the delivery process by preparing and storing the configuration file for access by the CPE. Alternatively, the provisioning system directly sends the configuration down to the CPE.

The process listens for an event or other notification from the CPE device about the status of configuration download. For example, a particular CPE device may issue an acknowledgment message if the configuration was correctly downloaded and applied. Alternatively, the CPE device may issue a warning message if an error in configuration occurred. Such messages may take the form of events that are published by the CPE device and subscribed to by the provisioning system.

Table 5 summarizes an example sequence of steps for provisioning a DSL subscriber CPE for voice and data service.

TABLE 5

PROVISIONING SEQUENCE FOR DSL CPE DEVICE

| Areas | Steps | Sequence | Comments |
|---|---|---|---|
| Subscriber CPE | Collect CPE parameters - IP Address FQDN Voice PVC Username and password Data PVC Create configuration file Load configuration file | 1 2a 2b 3 4 | Match DSLAM provisioning Match Radius server entry Match DSLAM provisioning |

In Table 5, steps that are labeled with letters indicate no dependencies within this sequence, i.e., steps can be executed in parallel, or in any order. For example, such steps can be executed in the order 1a-1c-1b-1d, or in the order 1b-1d-1a-1c.

The following is a description of a process for automating CPE provisioning based on a service request for voice and data service.

The process receives a service request for voice and data service for a DSL subscriber from the OSS.

The service request is decomposed into steps, as summarized in the table above.

The CPE device is provisioned using one or more specific provisioning steps.

The method notifies the OSS or service provider operator of the status of provisioning.

The following is a description of a process that may be used to implement the specific provisioning steps.

The process collects one or more CPE configuration parameter values from the service request that was previously received. Such parameter values may include CPE information (e.g., location, subscriber ID, vendor, type, model etc.), identifiers of data and voice PVCs, username, password, etc.

The process allocates and reserves IP addresses for voice and data as required, and updates the DNS server with one or more FQDNs associated with the IP addresses.

The process generates a set of configuration data for the CPE device. In one specific embodiment, the process involves generating a device-specific configuration file based on a pre-defined template of configuration commands and values.

The configuration data is delivered to the CPE device. In one embodiment, the data is sent directly to the CPE device. Alternatively, a configuration file is prepared for delivery as required by the tools that participate in CPE auto provisioning. Preparation for delivery may involve storing the configuration data at a specific location, or in a specific format.

The process listens for an event or other notification from the CPE device about the status of configuration download. For example, a particular CPE device may issue an acknowledgment message if the configuration was correctly downloaded and applied. Alternatively, the CPE device may issue a warning message if an error in configuration occurred. Such messages may take the form of events that are published by the CPE device and subscribed to by the provisioning system.

3.2 Provisioning Network Hardware Context

Figure 6A:
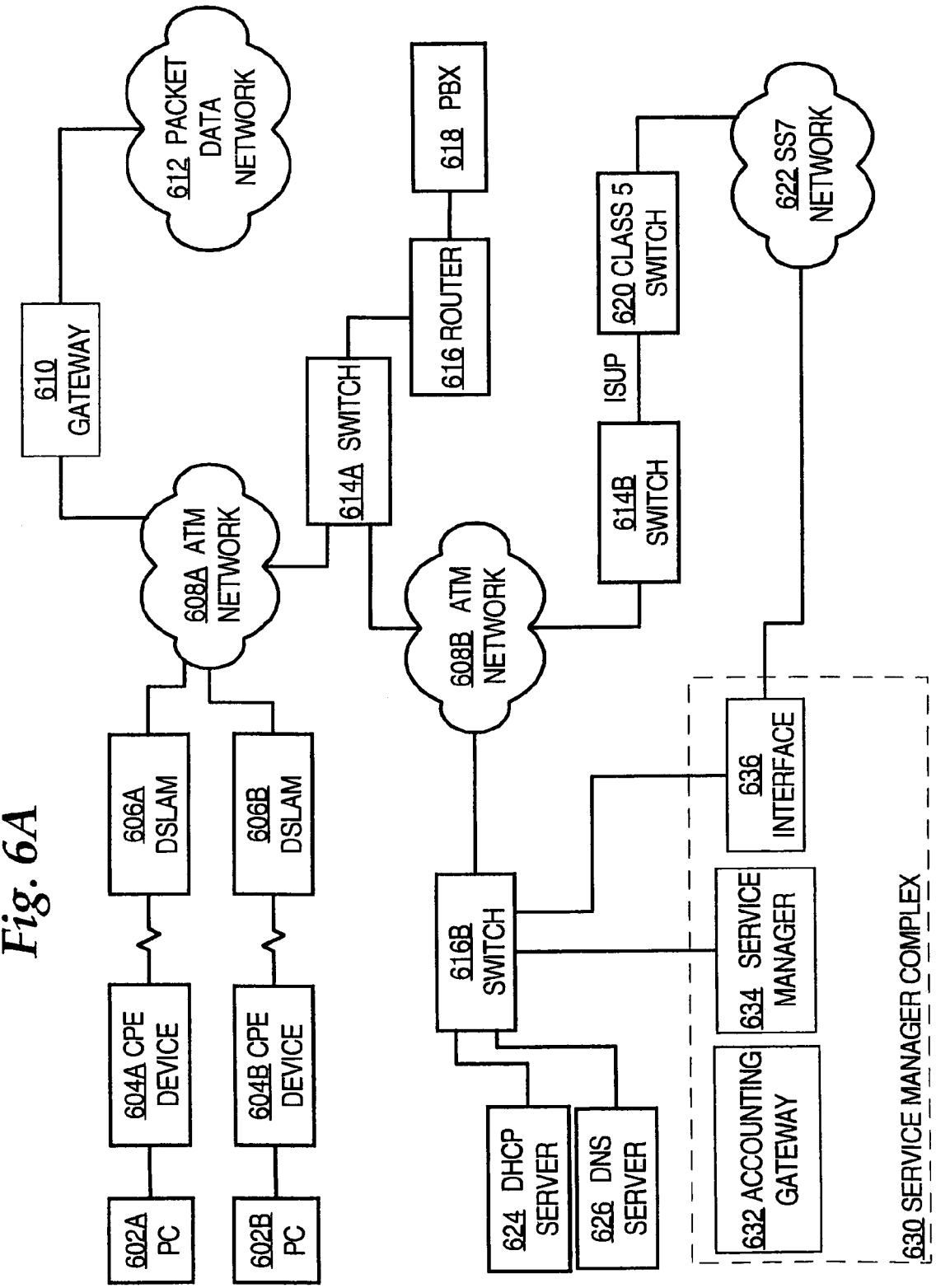
FIG. 6A is a block diagram of a network context in which an embodiment may be used.

FIG. 6A is a simplified block diagram of a next generation network context in which an embodiment may be used. In this example context, a plurality of end station devices such as personal computers 602A, 602B are communicatively coupled respectively to CPE devices 604A, 604B. The CPE devices 604A, 604B may be, for example, DSL modems, such as the Cisco 827 ADSL Router. Each CPE device 604A, 604B is communicatively coupled to an access device; in the case of DSL service, such an access device may be one or more DSLAM devices 606A, 606B. The access devices in turn are communicatively coupled to an asynchronous transfer mode (ATM) network 608A.

The ATM network 608A may be communicatively coupled to numerous other devices that provide various functions and services. As non-limiting examples, in FIG. 6A the ATM network 608A is coupled to a gateway 610 that interfaces to a packet data network 612. An example of packet data network 612 is the worldwide packet-switched data network known as the Internet. ATM network 608A may also interface to one or more switch devices 614A, 614B that are coupled to other equipment. For example, switch 614A is coupled to router 616, which is communicatively coupled to a private branch exchange (PBX) 618. Switch 614A may be, for example, a Cisco MGX 8850 IP+ATM Multiservice Switch, and router 616 may be a Cisco 2400 Series Router.

Switch 614A also may connect to a logically or physically separate ATM network 608B, which is communicatively coupled to a switch 614B, which in turn is coupled to a Class 5 switch 620. The Class 5 switch 620 is, for example, a telephony switch compatible with the AT&T/Bell Laboratories No. 5 Electronic Switching System (5ESS). The Class 5 Switch 620 is coupled to an SS7 telephony network 622, which connects to telephone company switching offices, service control points, and to PBXs or telephones.

ATM networks 608A, 608B also may be communicatively coupled to a switch 616B that provides communications to a service manager complex 630 and related facilities. In this example, the service manager complex 630 includes an accounting gateway 632, service manager 634, and an interface 636 to SS7 network 622. The service manager complex 630 is supported by a dynamic host control protocol (DHCP) server 624 and a domain name service (DNS) server 626. Embodiments of the processes described herein may be implemented as part of service manager 634.

Figure 6B:
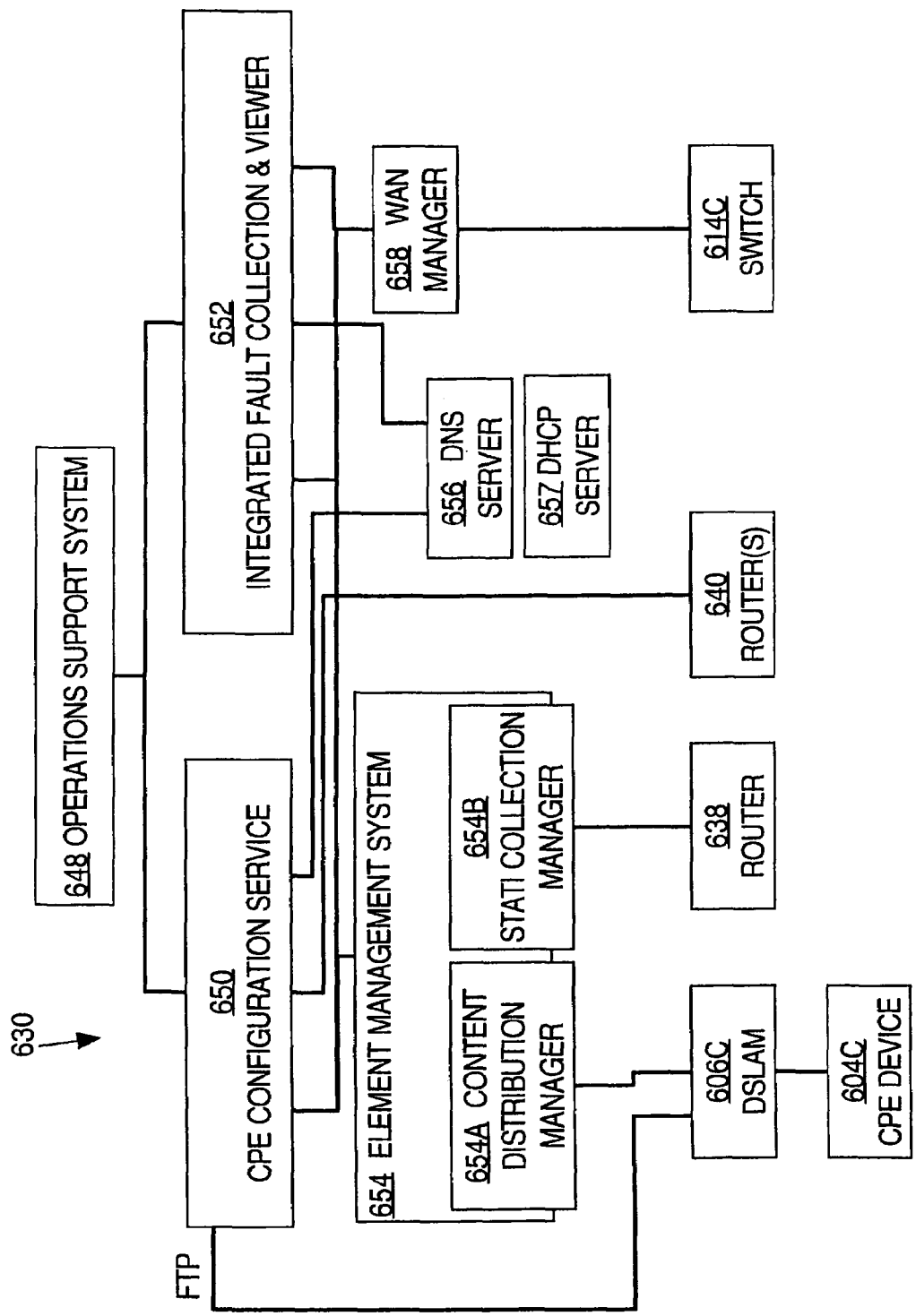
FIG. 6B is a simplified block diagram of an example logical architecture in which the processes described herein may be implemented.

FIG. 6B is a simplified block diagram of an example logical architecture in which the processes described herein may be implemented. In one embodiment, the architecture of FIG. 6B is used to configure one or more software elements that cooperate as part of service manager 634 of FIG. 6A to carry out the processes described herein.

An operations support system (OSS) 648 comprises, among other elements, a CPE configuration service 650, which may cooperate with an integrated fault collection & viewer 652, and with other elements. CPE configuration service 650 is communicatively coupled, for example, using a network connection, to one or more access devices such as DSLAM 606C, which provides DSL network service access to one or more CPE devices 604C. In general, CPE configuration service 650 provides a means to automate steps involved in provisioning IP addresses and fully-qualified domain names (FQDNs) for voice and data services, and configuration file generation and delivery for each subscriber CPE device in a next generation network.

CPE configuration service 650 also communicates with an element management system 654, which provides general network element management services. Element management system 654 may include a content distribution manager 654A, which provides multimedia content to CPE devices via DSLAM 606C, a statistics collection manager 654B, etc. A commercial example of content distribution manager 654A is Cisco Content Distribution Manager. A commercial example of statistics collection manager 654B is Cisco Statistics Collection Manager. CPE configuration service 650 may also communicate with other network elements through one or more routers 640.

In one embodiment, CPE configuration service 650 is supported by a DNS server 656 and by a DHCP server 657. The CPE configuration service 650 is also communicatively coupled to a WAN manager 658, which manages WAN elements such as switch 614C.

3.3 Architecture of CPE Provisioning Service

Figure 7:
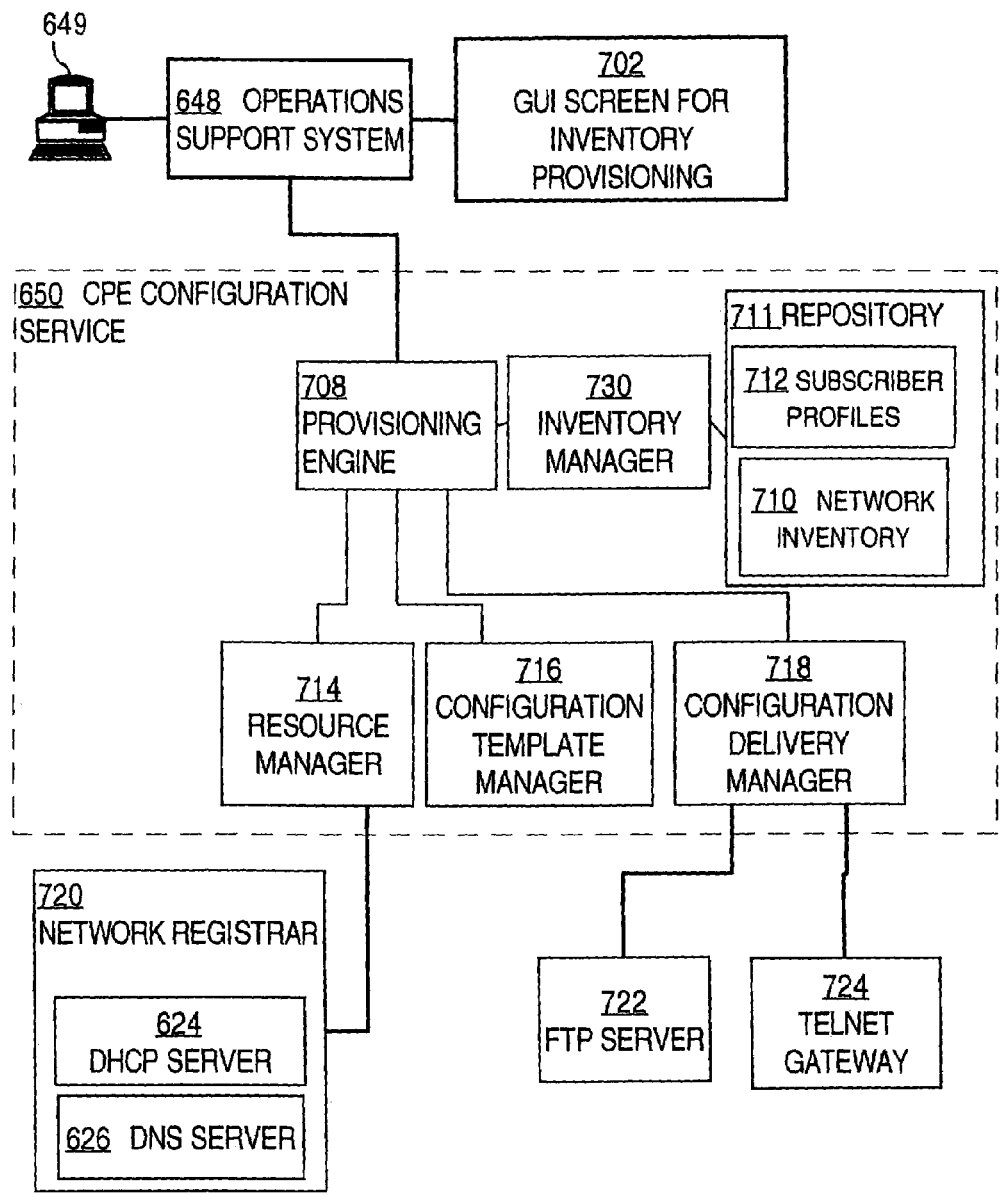
FIG. 7 is a block diagram of a CPE configuration service.

FIG. 7 is a block diagram of an architecture of a CPE provisioning service and supporting network elements.

An administrative client 649, such as a computer or workstation associated with a customer service representative, is communicatively coupled to operations support system 648.

CPE configuration service 650 generally comprises a provisioning engine 708 that has access to a network inventory 710 and subscriber profiles 712. Data representing the network inventory and subscriber profiles may be stored in an external database, directory, or other repository 711.

CPE configuration service 650 can generate a graphical user interface screen that relates to inventory provisioning, as indicated by block 702, which is sent to client 649 via OSS 648 and displayed. The GUI provides a tree view comprising network and provisioning/configuration screens.

Provisioning engine 708 can dispatch and receive commands and data to and from a resource manager 714, configuration template manager 716, and a configuration delivery manager 718. Optionally, an authentication server may be used to facilitate authentication and access control for users who log into CPE configuration service 650. It also provides a GUI screen for system administrator to add/delete/modify username/password for granting/denying operator access to CPE configuration service 650.

Also optionally, a Server Administration element may be provided to monitor the over-all health of the servers in CPE configuration service 650, and restart them if necessary. Provisioning engine 708 may include an Inventory Manager that provides a persistent store for the network partition and its containing elements; provides interfaces for creating/querying/updating/deleting network elements; and updates CPE status (based on operations on CPE, and events from the devices). Provisioning engine 708 may implement provisioning logic to create/update/delete subscriber CPEs and carry out generation and delivery of configuration files.

In general, resource manager 714 is responsible for communicating with outside resources such as a network registrar 720. In one specific implementation, network registrar 720 includes a DHCP server 624 and DNS server 626. Resource Manager 714 allocates and reserves resources, and provides an interface to resource allocation components such as DHCP server 624 and DNS server 626 that facilitate IP address allocation/de-allocation, FQDN update in DNS, MAC address registration etc.

Configuration template manager 716 manages one or more stored templates that describe CPE device configurations or configuration formats. It provides template file creation/modification/deletion and configuration file generation functions.

Configuration delivery manager 718 is responsible for delivering instantiated configuration data to CPE devices. It delivers and applies configuration to devices. It provides an interface to various CPE delivery mechanisms. For example, configurations may be delivered using FTP through FTP server 722, or by telnet protocol via telnet gateway 724. FTP and telnet are illustrated as non-limiting examples, and other configuration transport mechanisms may be used. For example, file transport mechanisms such as TFTP, FTP, or HTTP, or an event-bus—based transport mechanism, may be used.

In an automated address management approach, DHCP server 624 forms a part of network registrar 720, or may be a separate server, and is used as a source of automatically generated network addresses. Alternatively, in a manual address management approach, the DHCP function may be implemented in one or more applications of OSS 648. In this manual approach, subscriber IP addresses are allocated by the OSS application, and provided as input to CPE configuration service 650 using an appropriate user interface. FQDNs are updated and maintained using the DNS server 626.

In one mode of operation, an operator of a service provider associated with client 649 receives a customer request for service, such as a request for DSL connectivity. The operator enters customer information and a customer profile into the OSS 648. In addition, the operator selects a desired service and the service attributes based on the customer request. A service order is created and processed and a service request is sent from OSS 648 to CPE configuration service 650.

The operator logs in to CPE configuration service 650 and is authenticated by the Authentication Server 704. If the operator is authenticated, the service request is accepted. The provisioning engine 708 creates a service object. It analyzes the service attributes, and decomposes the service request into different service elements that interacts with the Resource Manager 714 (for resource allocation and reservation), the Configuration Template Manager 716 (for configure file generation) and the Configuration Delivery Manager 718 in order to fulfill the service request. A subscriber profile (with subscriber info and service attributes) and CPE object is created, or updated, and stored in persistent storage as part of subscriber profiles 712.

For example, to provision a Cisco 827 ADSL Router as a CPE device, provisioning engine 708 interacts with Resource Manager 714, which uses DHCP server 624 and DNS server 626 to allocate and reserve IP addresses, and update FQDNs in the DNS system. The provisioning engine 708 then interacts with Configuration Template Manager 716, provides a template file associated with the subscribed service and variables (e.g., IP addresses, PVCs, FQDNs) to generate the configuration file for the CPE device. Control then passes to Configuration Delivery Manager 718, which stores the configuration file on FTP server 722. The configuration file is later downloaded to a proxy element of a DSLAM device, and then to the CPE device.

In one embodiment, CPE configuration service 650 defines and publishes an object model that may be used by object-oriented software applications of external elements, to model entities such as sub-networks, DSLAM devices, CPEs etc. The object model is based on the ITU M.3100 generic network information model. The object model may encompass an inventory model at the device level, as well as a topology model and connectivity model.

In one specific embodiment, CPE configuration service 650 is based on Object Stream's ACT (Adapter Component Technology) platform and uses Common Object Request Broker Architecture (CORBA) to communicate with OSS 648. Such an embodiment provides distribution and scalability features that are useful for network service providers, and can accommodate large-scale deployment of subscribers.

In a first embodiment, the CPE configuration service 650 enables provisioning DSL and T1 CPE devices. For DSL CPE devices, configuration files are auto-generated (using templates) and stored in FTP server. MMI is used as the management protocol between the CPE and DSLAM. A hybrid method is used to configure the CPE device, involving a combination of MIB update and configure file download. For T1 CPE devices, such as the IAD 2421 device, configuration files are auto-generated using templates, and stored in a TFTP server. The configuration files are delivered and applied to the CPE by CPE configuration service 650 using telnet. The CPE configuration service 650 also may be used to provide template-based configuration file generation and delivery via telnet for other devices such as gateways.

In general, a CPE device in the foregoing context requires establishment of three PVCs that relate to data, voice signaling and bearer signals. To provide voice service, a CPE also requires up to three IP addresses and two FQDNs, comprising an IP address and FQDN for the voice signaling PVC; an IP address and FQDN for the voice bearer PVC; and an IP address for management. The management IP address may be optional. For example, for the Cisco 827 ADSL Router, the management IP address is not needed. For the IAD 2421 T1 CPE device, the signaling IP address and PVC are used for management, although an additional PVC and IP address can be allocated for management purposes.

Further, the data service may not require IP address. An IP address is needed if the CPE device is configured in non-bridged mode. The data IP address comes from different domain and IP sub-net. In one embodiment, the CPE configuration service 650 does not provision an IP address for data services; by default, data service is supported in bridged mode (i.e., no IP address required).

The IP addresses and FQDNs can be assigned by CPE configuration service 650 or OSS applications. The configuration parameters are made persistent as well as the configuration files. Subsequent requests can be made to update the device configuration, but not the IP addresses or FQDNs.

3.4 CPE Provisioning Examples

Figure 8A:
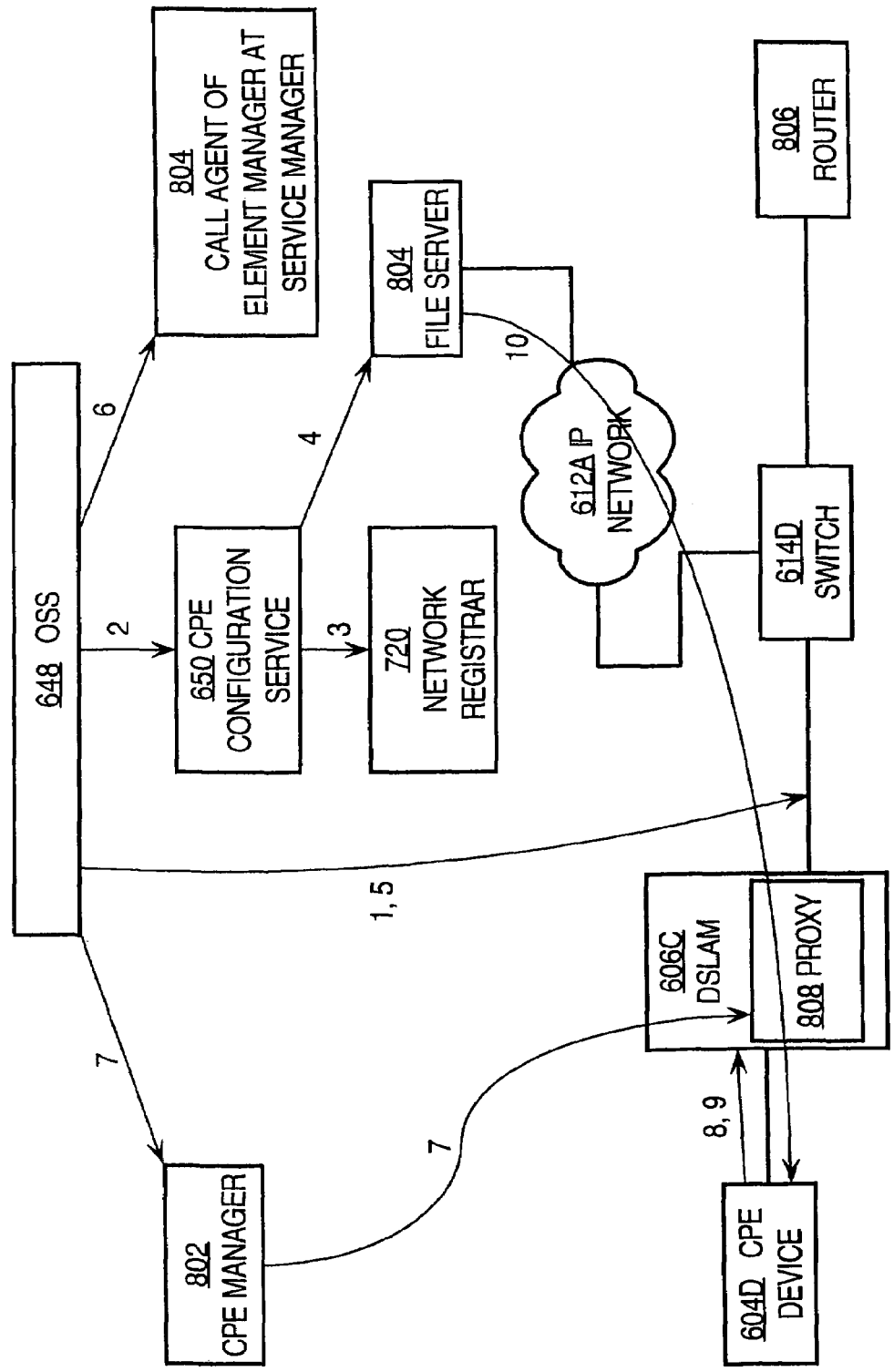
FIG. 8A is a diagram of a communications flow involved in carrying out automatic provisioning of a DSL CPE device, according to one embodiment.

FIG. 8A is a diagram of a communications flow involved in carrying out automatic provisioning of a DSL CPE device, according to one embodiment. For purposes of illustrating a simple example of auto-provisioning, FIG. 8A is described herein in the context of provisioning a Cisco 827 ADSL Router. However, embodiments are not limited to this example context.

In the example of FIG. 8A, the device undergoing configuration is CPE device 604D, which receives DSL network access under supervision of DSLAM 606C. The DSLAM is communicatively coupled to a switch 614D, which is coupled to an IP network 612A and to other network elements via a router 806. In general, in the example context, automatic provisioning is facilitated by a Proxy Element agent 808 implemented in the DSLAM 606C. The DSL CPE device 604D interacts with the Proxy Element using a management protocol MMI, such as SNMP over AAL5, to request for configuration download.

In operation, a service order is received and verified. The service provider also determines that the subscriber's physical location is served by existing wire or cable that is sufficient to deliver DSL service, in a process termed loop qualification.

Thereafter, the service provider operator sets up data and voice PVCs, as indicated by arrow 1. The service provider operator creates data, signaling and bearer PVC segments from the DSLAM 606C to the switch 614D. The service provider operator also creates a PVC segment from switch 614D to router 806 for the data PVC.

The service provider operator then interfaces with CPE configuration service 650 to provision a subscriber CPE in the network with the specified attributes and desired voice or data service, as indicated by arrow 2. As shown by arrow 3, CPE configuration service 650 allocates and reserves IP addresses for voice signaling and bearer PVC, if the addresses are not received from the OSS as part of the communication at arrow 2. CPE configuration service 650 also updates FQDNs as needed in an associated DNS server.

As indicated by arrow 4, CPE configuration service 650 generates an initial configuration file, based on a pre-defined stored template, and stores the resulting configuration file on file server 804.

At arrow 5, the operator adds mappings of PVCs to IP addresses mappings for signaling and bearer PVCs in the switch 614D. At arrow 6, the OSS or its operator provisions the subscriber in a Call Agent. In one embodiment, the call agent is a call agent 804 of an element management system at the service manager. The provisioning involved at arrow 6 may include, for example, FQDNs, which may be assigned by CPE configuration service 650 or by the OSS 648, telephone number, port number, subscribed features etc.

At arrow 7, the operator updates a management information base (MIB) of the Proxy Element 808 with the configuration file name, using a CPE device manager 802, which serves as an element management system for the Proxy Element 808.

Thereafter, when the CPE device 604D boots up, it uses a pre-configured PVC (e.g., 0/16) to connect to the Proxy Element 808, and uses MMI (SNMP over AAL5) as the management protocol, as indicated by arrow 8. At arrow 9, the CPE device 604D requests an image file download from the Proxy Element 808. As indicated by arrow 10, the Proxy Element 808 retrieves the filename and file server from a MIB and downloads the configuration file from the file server 804. The Proxy Element 808 then forwards the configuration file to the CPE device 604D using the management PVC.

In response to receiving the configuration file, and after the CPE device is operational, the CPE device 604D updates the MIB of Proxy Element 808 to reflect a successful download.

After initial CPE configuration using the foregoing process, the CPE configuration service 650 may be used to update a configuration. FIG. 8B is a flow diagram of a process of updating a configuration.

In block 852, the CPE configuration service 650 generates a configuration file, using a sub-template, and stores the created file on a file server. In block 854, the Operator updates the Proxy Element MIB by setting a "reload configuration" indication and the configure file name. In block 856, the CPE device issues a request to download a configure file from the Proxy Element. In block 858, the Proxy Element retrieves the filename and file server from the MIB, and downloads the configuration file from the file server. The Proxy Element then forwards the configuration file to the CPE via the management PVC, as shown in block 860. After the CPE is operational, it updates the PE MIB to reflect successful reconfiguration, as indicated by block 862.

In one embodiment, CPE configuration service 650 carries out a pre-stage phase of configuration for T1 CPE devices. The pre-stage phase is followed by a configuration update phase. In the pre-stage phase, CPE configuration service 650 generates a boot configuration file for T1 CPEs. The boot configuration file defines PVCs for voice and data, IP addresses and FQDNs for voice, and other configuration parameters. When the T1 CPE is plugged into the network, it applies the pre-staged configuration. The service provider then uses CPE configuration service 650 for configuration updates.

Figure 10A:
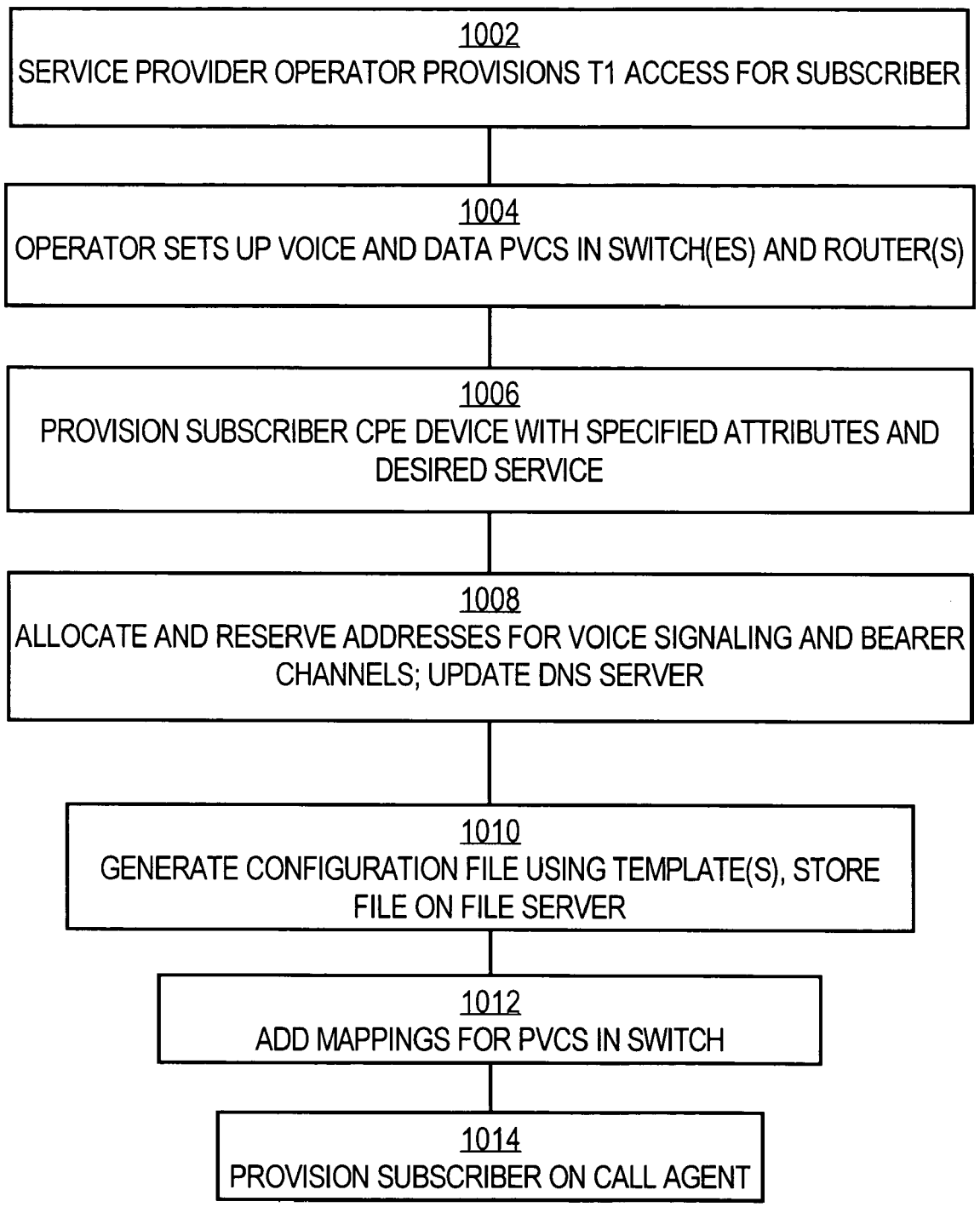
FIG. 10A is a flow diagram of one embodiment of T1 CPE pre-stage provisioning.

FIG. 10A is a flow diagram of one embodiment of T1 CPE pre-stage provisioning.

In block 1002, a service provider operator provisions T1 Access for the subscriber. In block 1004, the operator sets up data and voice PVCs in the switch 614D and in the router 806. In block 1006, the OSS operator interfaces with CPE configuration service 650 to provision a subscriber CPE in the network with specified attributes and desired service (voice/data).

In response, in block 1008, CPE configuration service 650 allocates and reserves IP addresses for voice signaling and bearer PVC (if such address are not received as part of the request), and updates the FQDNs in the DNS server. In block 1010, the CPE configuration service 650 generates a configuration file, using one or more templates, and stores the file on TFTP server. The configuration file is then pre-staged on the T1 CPE device.

In block 1012, the operator adds (PVC, IP address) mappings for signaling and bearer PVCs in the switch 614D. In block 1014, the OSS/operator provisions the subscriber on the Call Agent 804. This may involve establishing FQDNs, which may be assigned by CPE configuration service 650 or the OSS 648, creating and storing a phone number, port number, subscribed features, etc.

Figure 10B:
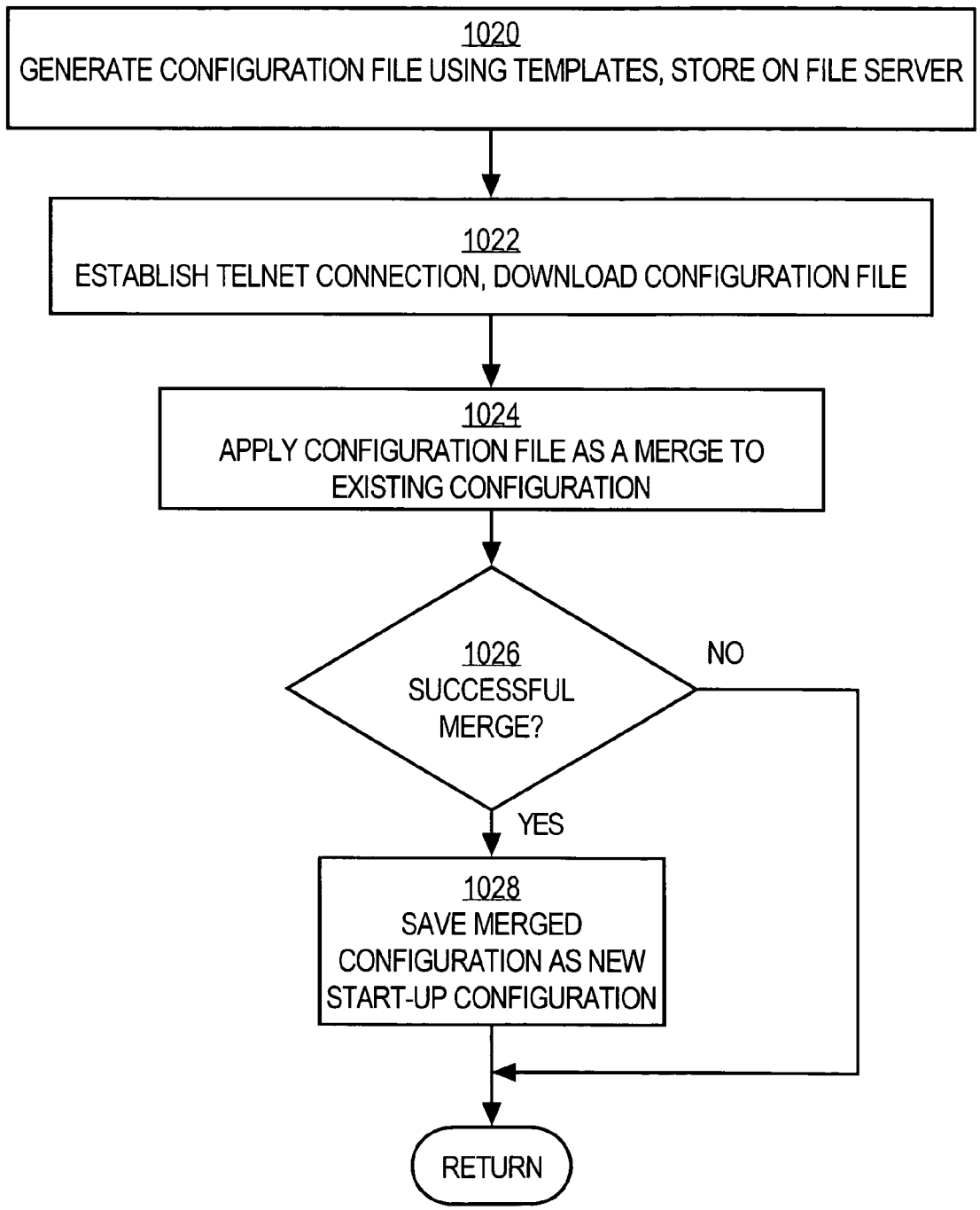
FIG. 10B is a flow diagram of a procedure for updating a configuration for a T1 CPE device.

FIG. 10B is a flow diagram of a procedure for updating a configuration for a T1 CPE device.

In block 1020, CPE configuration service 650 generates configuration file (using templates) and stores the file on a file server, such as a TFTP server. In block 1022, the CPE configuration service 650 establishes a telnet connection to the CPE device 604D, and downloads the configure file. In block 1024, the CPE configuration service 650 applies the configuration file as a merge to the CPE device's existing configuration. If the merge is successful, the CPE configuration service 650 saves the merged configuration as the start up configuration for the CPE device, as indicated by block 1026. The CPE configuration service 650 returns, to OSS 648, an indication of whether configuration is applied and saved, as shown by block 1028.

4.0 Automated CPE Provisioning Approach in Detail

4.1 Network Inventory Management

Inventory manager 730 provides access to repository 711 of CPE configuration service 650 for other elements of the CPE configuration service. In general, repository 711 contains information defining network partitions and containing devices, which information is termed "Inventory" herein. In one embodiment, the information in the repository about containing devices is represented at the device level and includes values such as CPE type, subscribed service, PVCs, IP addresses, service parameters etc. Inventory manager 730 also provides an interface for creating, querying, updating, and deleting objects in the Inventory.

According to one embodiment, an information object model used by CPE configuration service 650 defines sub-network objects and network element objects in the Inventory.

Sub-network objects define network partitions based on criteria such as administrative domain or geographical locations, and are logically organized in a hierarchical containment tree. Sub-networks are defined and created by service providers. CPE configuration service 650 does not control or constrain how the network is partitioned. For example, four hierarchies of sub-networks can be created: region, site, central office, and DSLAM-group, wherein the latter contains a DSLAM and its associated CPEs.

An instance of CPE configuration service 650 can support one or several areas of the network. Therefore, system configuration data for CPE configuration service 650 is stored in the corresponding sub-network. When configuring a CPE or other device, CPE configuration service 650 traverses up the containment tree, from the CPE device towards the root object, to find the first sub-network object that has system configuration data, and applies that system configuration data to itself.

The system configuration data provide information for several purposes: as input data to generate configure files (e.g., TIME server IP address, call agent info); to locate the DHCP and DNS server for IP address allocation and FQDN update; to identify the DHCP address pool for IP address allocation (scope name); to locate the FTP/TFTP server or Telnet Gateway to deliver the configure files; and to locate the SNMP proxy for sending SNMP re-set for provisioning update.

Further, each CPE configuration service 650 installation has a set of default system configuration data in a configuration file. The default configuration is applied if CPE configuration service 650 fails to find a sub-network object with system configuration data while traversing up the containment tree.

Network element objects are used for provisioning/configuration and fault management purposes. In one embodiment, network element objects represent DSLAM devices, DSL CPE devices, T1 CPE devices, and 911 Gateway devices.

Each network element object that represents a CPE device stores information including: device type and model; service type; subscriber ID (if present); containing sub-networks and device name; provider edge associations (e.g., DSLAM ID, Loop ID); scope names that identifies DHCP address pools for voice; voice signaling and bearer PVCs; voice signaling and bearer IP addresses and FQDNs, as assigned by the CPE configuration service 650 or OSS; management PVC and IP address, if different from the signaling values; data PVC; service attribute; an identifier of a template file that was used for latest configuration file generation; and template data.

CPE configuration service 650 supports the containment relationship among Inventory objects, and maintains a containment tree of the objects in memory. The Inventory is loaded with data ("populated") using a graphical user interface provided by CPE configuration service 650 or using an Inventory Management API. Sub-network objects are populated in an initialization phase, prior to subscriber provisioning.

4.2 States and State Transitions

CPE configuration service 650 creates and stores a provisioning state value for each CPE device object. The provisioning state value identifies the then-current state of CPE configuration file generation. A CPE is considered "provisioned" only when CPE configuration service 650 has generated a full configuration file for voice service and successfully delivered it. In one embodiment, a DSL CPE device is considered "provisioned" when CPE configuration service 650 has successfully generated a configuration file and stored it on a file server. A T1 CPE device is considered "provisioned" after CPE configuration service 650 has successfully downloaded and applied the configuration file via telnet. The states that are maintained by CPE configuration service 650 facilitate provisioning of CPE devices in multiple steps by the operator.

Figure 9:
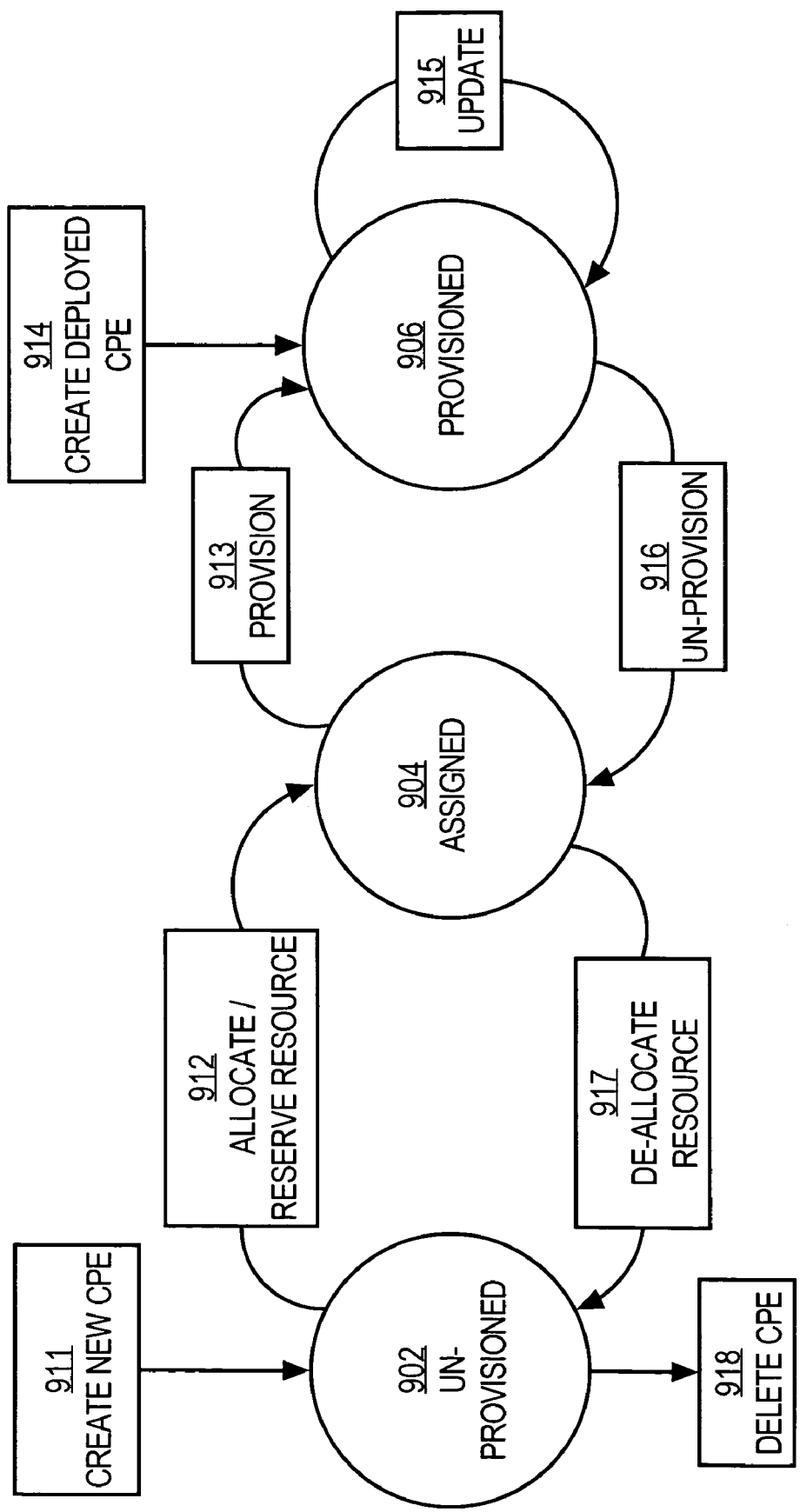
FIG. 9 is a state diagram illustrating states applicable to CPE devices as they are provisioned.

FIG. 9 is a state diagram that illustrates states of a CPE device during provisioning. In general, a CPE object in CPE configuration service 650 can have one of three provisioning states at any time. In Un-provisioned state 902, the CPE device is not configured with voice service. The CPE device may have a partial configuration, e.g., connectivity for a management interface, and may be up running with an operational state of "up", but it is not ready for voice communication.

In Assigned state 904, resources for voice service are allocated and reserved. For example, IP addresses and FQDNs for signaling and bearer are assigned. However, the CPE device is not configured with voice service. In Provisioned state 906, a full configuration including voice service for the CPE has been generated and delivered. The CPE may or may not be running; its operational state can be "up", i.e. ready for voice, or "down", i.e., configure file is generated and waiting for downloading.

Block 911 through block 918, inclusive, of FIG. 9 represent state transitions among states 902, 904, 906. In block 911, a CPE object transitions from external un-provisioned CPE to un-provisioned CPE in CPE configuration service 650. This state transition allows a new, un-provisioned CPE device to be introduced into the Inventory of CPE configuration service 650. In one specific embodiment, as part of block 911, CPE configuration service 650 creates a CPE object in its inventory with these attributes: Subscriber ID (optional); device type and model (e.g., DSL CPE, T1 CPE); device name; device ID (optional, e.g., CPE Mac address); Sub-network name(s) (e.g., region, site, central office) in which the CPE belongs; Provider edge association: e.g., DSLAM ID, loop ID (for DSL CPE); and provisioning state (un-provisioned).

In block 912, a CPE object transitions from the Un-provisioned state 902 to Assigned state 904. This state transition allocates and reserves resources for the CPE device depending on the service type, For example, block 912 may involve allocating and reserving IP addresses for voice signaling and bearer PVC in DHCP, and updating DNS. A DNS update may take time, and therefore a CPE may not be in the Assigned state 904 until FQDNs are updated. If the DNS update fails, an error message is logged and also displayed in the GUI, which requires operator intervention to correct the DNS problem. In that case, any IP addresses allocated by CPE configuration service 650 are de-allocated, and the CPE remains in Un-provisioned state 902.

If the DNS update is successful, CPE configuration service 650 updates the CPE object with these attributes: Service type: e.g., DSL Voice and data service; Service request number (optional); Scope names that identify DHCP address pools for voice; Voice signaling, bearer PVC; Data PVC; IP address/FQDN for signaling and bearer (optional); PVC and IP address for management (optional); Provisioning state (assigned).

In block 913, a CPE object transitions from the Assigned state 904 to the Provisioned state 906. In this state transition, a configuration file is generated that references the resources that are allocated, the configuration file is downloaded and applied to the CPE device, and the CPE is brought to a provisioned state. CPE configuration service 650 also updates the CPE object with these attributes: operation (create/update/delete); Template file name (if not using the system template); Service attributes (used as input for configure file generation); Template data; Provisioning state (provisioned).

In block 914, an object representing an external deployed CPE transitions to an object representing a provisioned CPE in CPE configuration service 650. This state transition allows a CPE that is deployed and has been provisioned outside of CPE configuration service 650 to be introduced into the Inventory of CPE configuration service 650. The operational state is of the CPE device is "up".

When a deployed CPE is introduced to CPE configuration service 650, values for these attributes for CPE are required, and may be provided to CPE configuration service through entry in an appropriate graphical user interface: device type and model; service type; subscriber ID; CPE to provider edge association (e.g., DSLAM ID, loop ID for DSL CPEs); Scope names that identify DHCP address pools for voice and data; Device name and containing sub-networks; Device ID (optional, e.g., MAC address); Voice signaling, bearer PVCs; Voice signaling, bearer IP addresses/FQDNs (assigned by CPE configuration service 650 or OSS); Management PVC and IP address (if different from the signaling); Data PVC and IP address (if present); template file (if not using the system template file for CPE configuration); template data; Provisioning state (provisioned).

In response, CPE configuration service 650 creates a CPE object with these attributes and stores the object in its persistent store.

In block 915, a CPE object undergoes a configure update. This state transition allows a configuration update to be applied to a provisioned CPE. CPE configuration service 650 generates the configuration file and delivers it to the CPE. In one embodiment, for a DSL CPE device, the configuration file is stored on an FTP server, for download via the Proxy Element. In another specific embodiment, for a T1 CPE device, the configuration file is stored on a TFTP server. Initial configuration is pre-staged in T1 CPE. Configuration update is carried out via Telnet to the device to download the configure file. The updated configuration is applied as a merge to the existing configuration. If the merge is successful, the configuration merge is saved as a new start up configuration.

In block 916, a CPE object transitions from Provisioned state 906 to Assigned state 904. This state transition removes the configuration on CPE related to voice/data services. CPE configuration service 650 generates the configuration file and delivers to the CPE.

In block 917, a CPE object transitions from Assigned state 904 to Un-provisioned state 902. This state transition de-allocates resources used by the CPE. In one specific embodiment, block 914 involves de-allocating IP addresses from DHCP and updating DNS. If the DNS updates fail, an error message is logged and displayed in the GUI. The error message may prompt the operator to intervene to fix the DNS problem. The CPE then transitions into un-provisioned state 902.

In block 918, a CPE object transitions out of un-provisioned state 902 as part of a delete operation. This state transition removes a CPE object from CPE configuration service 650. The CPE's configuration files are also deleted from FTP server.

4.3 Service Requests

In one embodiment, a service request comprises the information set forth in Table 6.

TABLE 6

SERVICE REQUEST INFORMATION

| DATA ELEMENT | NOTES & EXAMPLES |
| --- | --- |
| Service type | E.g., DSL Voice and data service |
| Operation | Create, Modify, Delete |
| Service request number | Optional |
| Subscriber ID | Optional |
| Device type and model | E.g., DSL CPE, T1 CPE |
| Device name | |
| Device ID | Optional; e.g., CPE Mac address |
| Sub-network name to which the CPE belongs | |
| Provider edge association | e.g., DSLAM ID, loop ID for DSL CPE device |
| Scope names that identifies DHCP address pools for voice | |
| Voice signaling, bearer PVC | |
| Data PVC | |

TABLE 6-continued

SERVICE REQUEST INFORMATION

| DATA ELEMENT | NOTES & EXAMPLES |
| --- | --- |
| IP address/FQDN for signaling and bearer | Optional |
| PVC and IP address for management | Optional |
| Template file name | |
| Service attributes | For configure file generation |
| Template data | |

Subscriber ID and Service Request Number are optional fields of a service request. Providing a unique subscriber ID and service request number, facilitates searching an audit trail log using subscriber ID and/or service request number if needed.

4.4 Preparation for Provisioning

Figure 11:
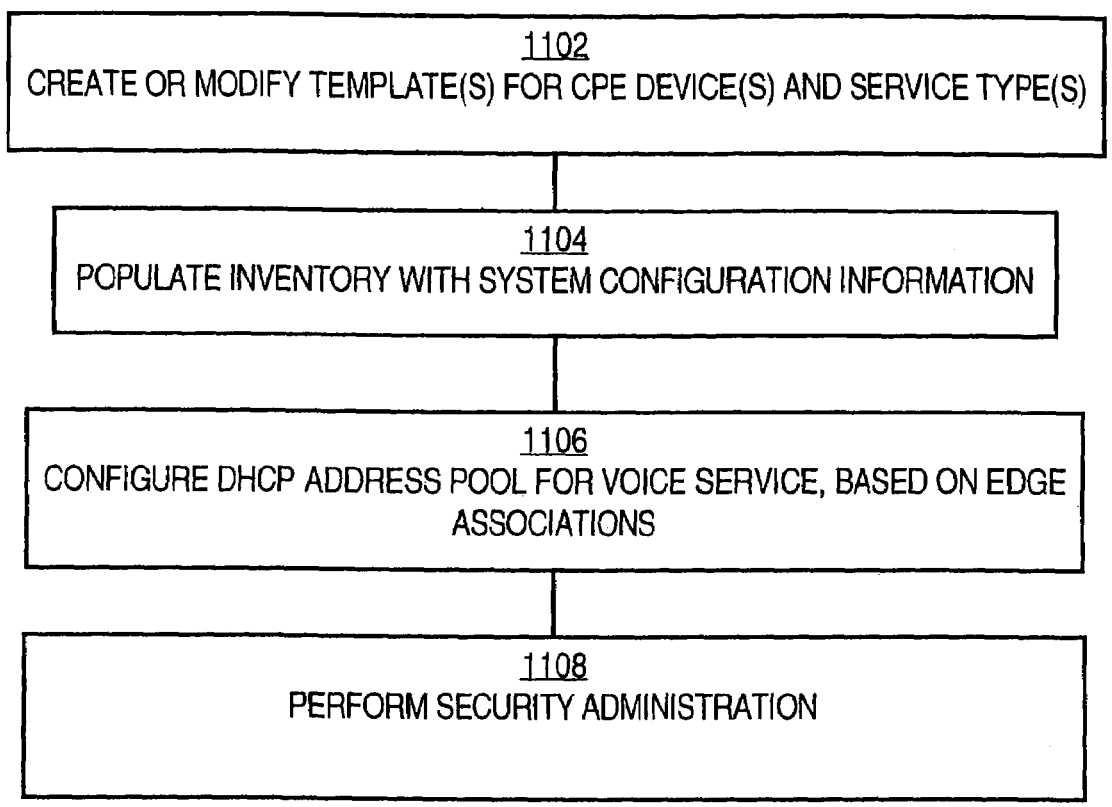
FIG. 11 is a flow diagram of a process of preparing for subscriber CPE device provisioning.

FIG. 11 is a flow diagram of a process of preparing for subscriber CPE device provisioning. The steps of FIG. 11 may be carried out by an operator of the OSS 648 or an administrative user of CPE configuration service 650.

In block 1102, one or more templates for CPE devices and service types are created or modified.

In block 1104, the Inventory is populated with information sufficient to establish a system configuration for the CPE configuration service.

In block 1106, a DHCP address pool is configured for voice service, based on the CPE to provider edge association (service area) information that has been previously received.

In block 1108, security administration is carried out by setting up username and password pairs in the Authentication Server for those operators who are granted access to CPE configuration service 650.

Referring again to block 1102, one or more template files are created or modified. In one specific embodiment, such operations are carried out using configuration template manager 716. For each service type, operation type and CPE type, CPE configuration service 650 provides a pre-defined template file that is stored in persistent storage. In one specific embodiment, CPE configuration service 650 internally stores a template registration table. The template registration table has a plurality of rows, wherein each row stores column values for CPE type, service type, operation type, and template file name or location. Using the index table, CPE configuration service 650 can select the correct template for each service request. In one embodiment, a user also can extend the pre-defined template, create a new template, or over-ride the default template that is provided by CPE configuration service 650. If multiple template files are registered for the same device type, service type and operation type, the user is prompted to select one using the GUI.

As part of block 1102, a default system configuration is created. The default system configuration may be created bas on a pre-defined system template. In one embodiment, the system template contains information that defines, for various CPE devices: Call Agent configuration (IP address, service type, version); data, signal, bearer PVC configuration; signal, bearer IP address configuration; bridged mode for data (no IP address required); and voice ports dial peer configuration.

Each system template file of CPE configuration service 650 contains values of variables that are service related. For example, values for ${System_IPAddress_bearer} and ${System_IPAddress_signal} variables are provided. Each system template file contains such variable values for each CPE type and service type. Values for certain variables may be generated by CPE configuration service 650, such as IP address. Values for other variables may be derived from a service request. A template file may also contain non-service related variables, e.g. SNMP trap destination IP address, which are required for configuring the device. The values for such variables are specified by the OSS applications or OSS operator as additional input to CPE configuration service 650 in a service request.

Referring now to block 1106, a DHCP address pool is configured for voice service. An IP address pool for each service area is configured prior to subscriber CPE provisioning. Each address pool configures a group of IP addresses within an IP subnet that are available for allocation for voice signaling and bearer PVCs. Each DHCP address pool has a policy associated with it that allows configuration data such as TFTP server name, Call Agent info etc. to be specified. The policy also specifies DHCP-lease-time, which is generally set as 'permanent'.

In one specific embodiment, an operator uses network registrar 720, through either a command line interface or GUI, to configure two DHCP IP address pools in DHCP server 624. The operator also uses network registrar 720 to configure DNS server 626 for scope, policy and DNS zone information. Specific steps involved in this process may include:

Create a DHCP scope (IP address pool) with IP address range and subnet mask for voice signaling IP address allocation Define policy associated with the scope Set DHCP lease time to permanent, so that the IP address reservation will never expire.

Create a DHCP scope (IP address pool) with IP address range and subnet mask for voice bearer IP address allocation Define policy associated with the scope Set DHCP lease time to permanent, so that the IP address reservation will never expire.

As indicated in block 1108, a security configuration is established. In one specific embodiment, access to CPE configuration service 650 is controlled by a login screen, and an operator is authenticated by a username, and password. When an operator logs in, the username and password are sent to Authentication server 704, which authenticates the operator using (username, password) pairs stored in its data store, and returns a response of "pass" or "fail" to the GUI login screen. The Authentication server provides a GUI screen with which a system administrator may add, delete, or modify a username or password for the purpose of granting or denying an operator access to CPE configuration service 650.

Referring now to block 1104, an initial Inventory data population is created. Based on how CPE configuration service 650 is installed in a larger network environment, such as the environment shown in FIG. 7, the OSS or its operator populates the Inventory with information about the system configuration. Such information may include IP addresses of the TFTP server, DHCP server, DNS server, etc.

The information may also identify one or more appropriate sub-network objects (e.g., Region, site, CO or DSLAM complex). In one specific embodiment, the following input is required for creating a sub-network object: containing sub-network name (if not root); sub-network type: e.g., region, site, central office, DSLAM-group etc.; sub-network name: e.g., US-West, Calif., San Jose, DSLAM-group-3; system configuration data for the sub-network (optional). The system configuration data, if provided, consists of DHCP scope names and IP address ranges for voice service (signaling and bearer); CNR servers (DHCP and DNS); FTP server name/IP address; TFTP server name/IP address; Telnet Gateway host name; and Call Agent info (IP address, service type, version).

4.5 Provisioning a DSL CPE Device

Figure 12A:
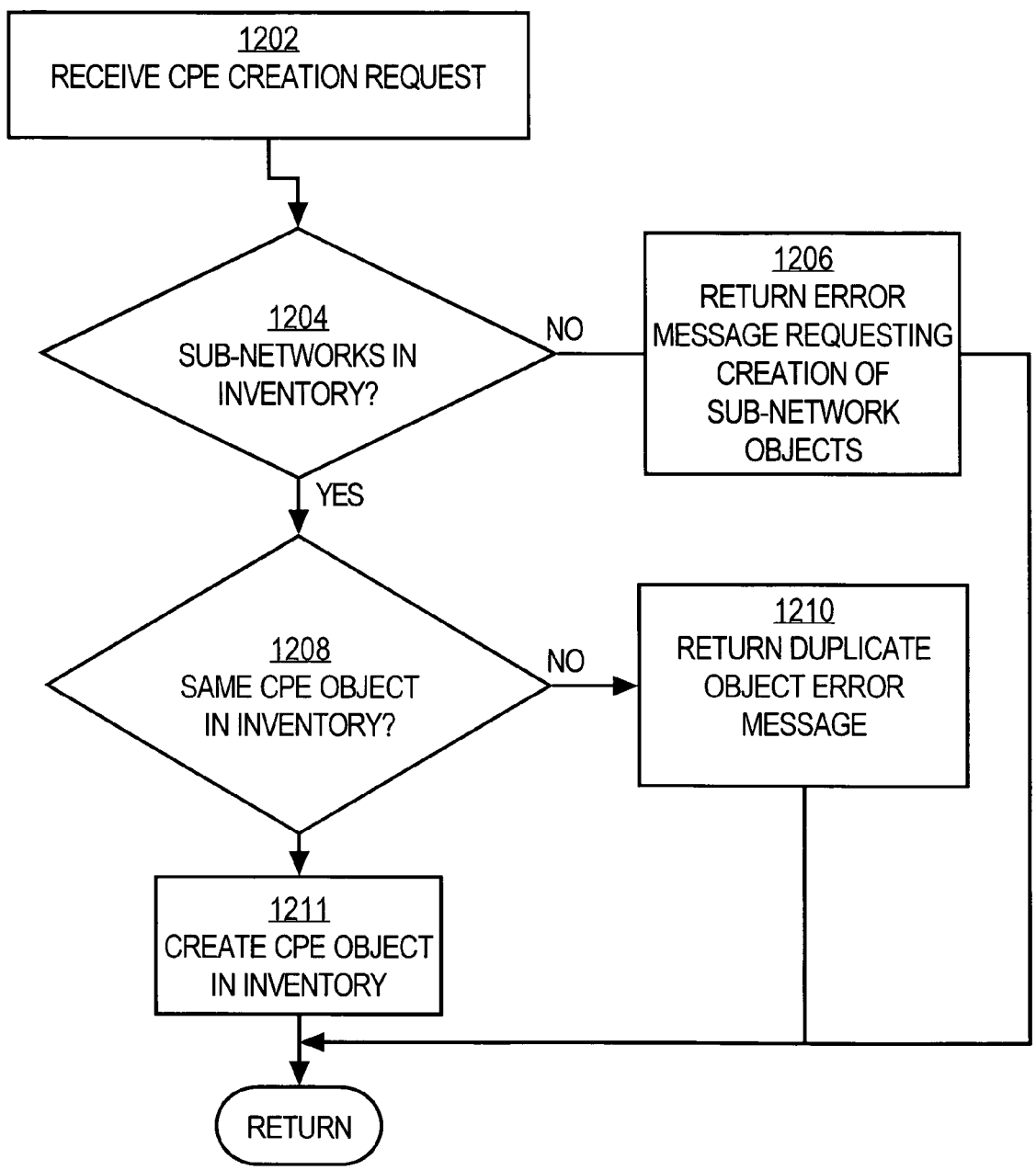
FIG. 12A is a flow diagram of a process of automatically provisioning a DSL CPE device.

FIG. 12A is a flow diagram of a process of provisioning a DSL CPE device.

In block 1202, a CPE creation request is received. In one specific embodiment, a CPE creation request is a message or programmatic call that contains values for: device type and model; subscriber ID (optional); Full pathnames identifying a sub-network in which the CPE device resides, e.g., region/site/central office/DSLAM Complex2; Device name; DSLAM ID, loop ID. In this embodiment, the CPE creation request is processed by a programmatic function that returns a message indicating that a subscriber CPE object was created, or that a failure occurred.

Block 1202 or a function that implements it may include various sub-steps. As indicated by block 1204, the sub-steps include a check whether the sub-networks (including the DSLAM Complex that contains the DSLAM object identified by <DSLAM ID>) already exist in CPE configuration service 650 Inventory. If the sub-networks identified in the request are not found in the Inventory, then the process returns an error message that requests the OSS or its operator to create objects representing the sub-networks and DSLAM group object in the Inventory of CPE configuration service 650, as shown by block 1206.

In block 1208, the process checks to determine whether a corresponding CPE object already exists in the Inventory of CPE configuration service 650. If a duplicate CPE object exists, then an error message is returned, as indicated by block 1210. Otherwise, as shown by block 1211, the process creates a CPE object in the Inventory having values for device type and model; subscriber ID (if given in the request); full path sub-network names; device name; DSLAM ID and loop ID; Provisioning state (un-provisioned). The status of the above steps is also logged in a log file for purposes of providing an audit trail.

Figure 12B:
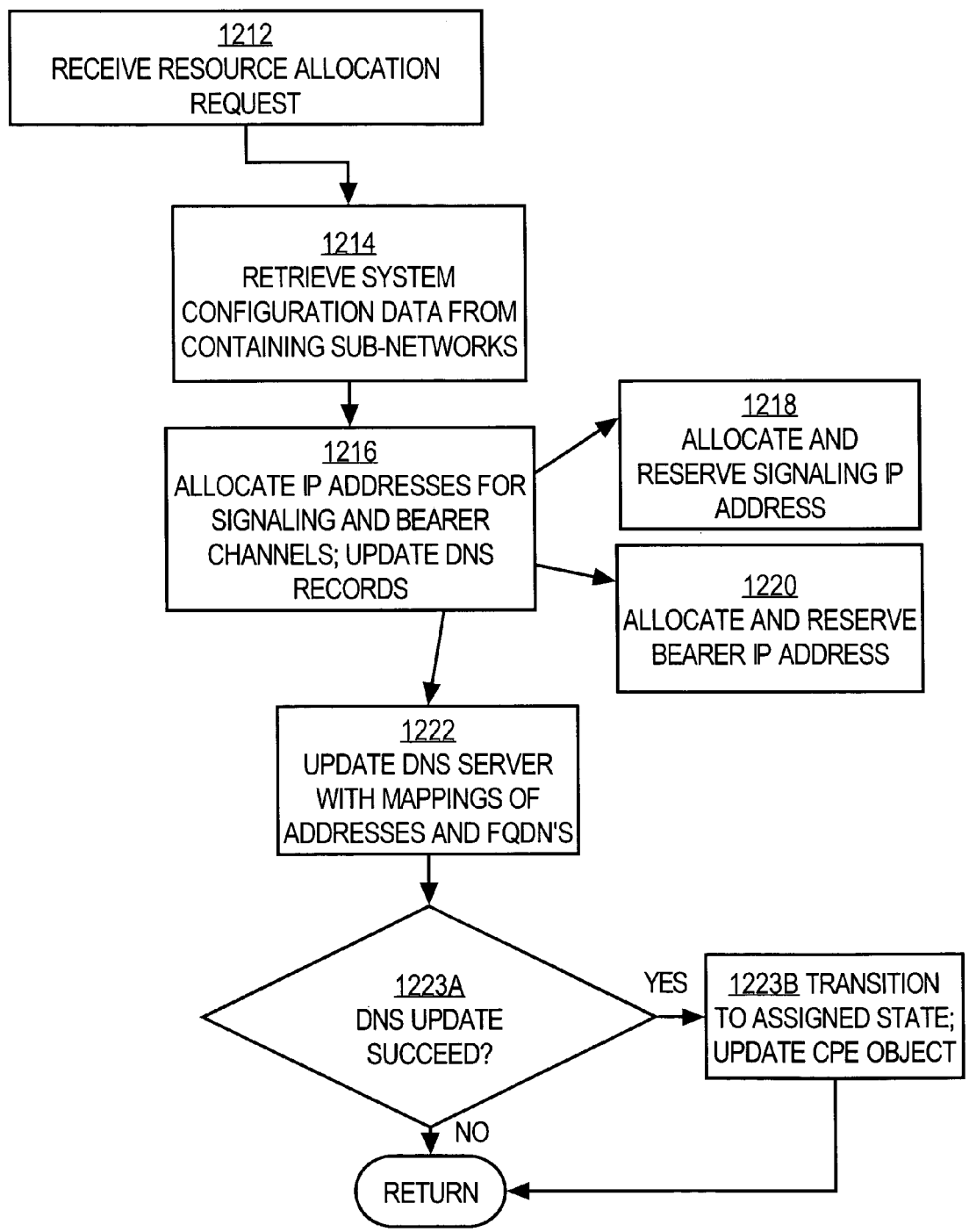
FIG. 12B is a flow diagram of other steps in a process of automatically provisioning a DSL CPE device.

Referring now to FIG. 12B, in block 1212, a resource allocation request is received. In one specific embodiment, the resource allocation request contains values for Service type (e.g., data and voice service); Service request number (optional); Voice signaling, bearer PVC; IP address/FQDN for signaling and bearer PVC (optional); Scope names of DHCP address pools for voice (optional); Data PVC; and Management PVC and IP address (optional, needed only if different from signaling). If the resource allocation process is successful, then it returns an output message that contains the IP addresses and FQDNs for signaling and bearer PVCs that have been allocated. If the process fails, then a failure message is returned.

In one specific embodiment, block 1212 involves sub-steps shown in block 1214, block 1216, etc.

In block 1214, the process retrieves system configuration data from the containing sub-networks. For example, the Inventory containment tree is traversed starting from the <DSLAM ID> object towards the root, stopping on the first sub-network that has associated system configuration data. If configuration data does not exist in the sub-networks, then the default configuration is used.

In block 1216, IP addresses are allocated for signaling and bearer PVCs by communicating with the DHCP server, and corresponding DNS records are updated. In one specific embodiment, block 1216 involves determining whether IP addresses/FQDNs are given in the request received in block 1212. If not, then the DHCP scope names are used to identify one or more DHCP address pools that have been obtained from user input or the system configuration. To obtain specific network addresses for signaling, bearer and management channels, an address mock-up approach is used. In conventional DHCP processing, a DHCP request includes a unique identifier, such as a MAC address, of the device for which a network address is requested. However, in the present context, the CPE devices are not in direct communication with the DHCP server, and therefore are not registered with the DHCP server, which will not recognize their MAC addresses if they are provided in a request. Therefore, to obtain a signaling, bearer, and management address, a mock-up identifier analogous to a MAC address is generated. The mock-up identifier may comprise a pseudo-random value, a concatenation of a pseudo-random values with various type identifiers, etc. The mocked-up identifiers are provided to the DHCP server in requests for network addresses.

In block 1222, the process updates the DNS server with mappings for (signal IP address, signal FQDN) and (bearer IP address, bearer FQDN). If the DNS update fails, then the preceding step is rolled back, an error is logged, and the process returns with a failure message. In that case, the CPE device remains in "un-provisioned" state 902. If the DNS update succeeds, as shown by block 1223A, then the CPE object enters the Assigned state 904, as indicated by block 1223B, and the CPE object is updated with values for Service type; Service request number; Voice PVCs, IP addresses and FQDNs (signal and bearer); Client ID used to reserve IP address in DHCP; Scope name of DHCP address pool for voice; Data PVC; Management PVC, IP address (if not given, use the signaling PVC, IP address); Provisioning state (assigned). The status of the above steps also is logged in a log file to provide an audit trail.

Referring now to FIG. 12C, In block 1224, a CPE provision request is received. In one specific embodiment, the CPE provision request contains values for Service request number (optional), Operation ("create"), Template file (optional), Service attributes (used as input for generating configure file), and Template data (values of service provider defined variables in configure template file). If provisioning is successful, the process returns a configuration file name and FTP server name. If provisioning fails, the process returns error messages.

In block 1226, a configuration file is generated for the CPE device. At block 1227A, if a template file name is not specified in the service request, then the process selects and retrieves a template file based on the device type and service type. The selection is carried out using the registration table. In one embodiment, each template file is based on a device configuration file appropriate for the type of device represented by the CPE device, and the type of service to be provided to the device. The template file omits values for fields that require subscriber-specific information, such as signaling and bearer PVC, IP addresses for signaling and bearer PVC, Data PVC, Call Agent information such as IP address, service type, version, etc.

The template data is then generated or derived, as shown by block 1227B based on the input data. In one embodiment, generating the template data involves generating values for a signaling and bearer PVC, IP addresses for signaling and bearer PVC, Data PVC, Call Agent info such as IP address, service type, and version, etc., and combining such values with the template file to result in creating a complete, subscriber-specific configuration file for the specific CPE device and service of the subscriber. The configuration file is given a unique name and saved.

In block 1228, the configuration file is sent to a file server.

In block 1230, the CPE object in the Inventory is updated with values for Service request number (if given), Template file name, Configuration file name, FTP server name/IP address, Service attributes, Template data, Provisioning state (provisioned). The CPE object enters the Provisioned state 906. The status of the above steps is logged in the log file.

Figure 12D:
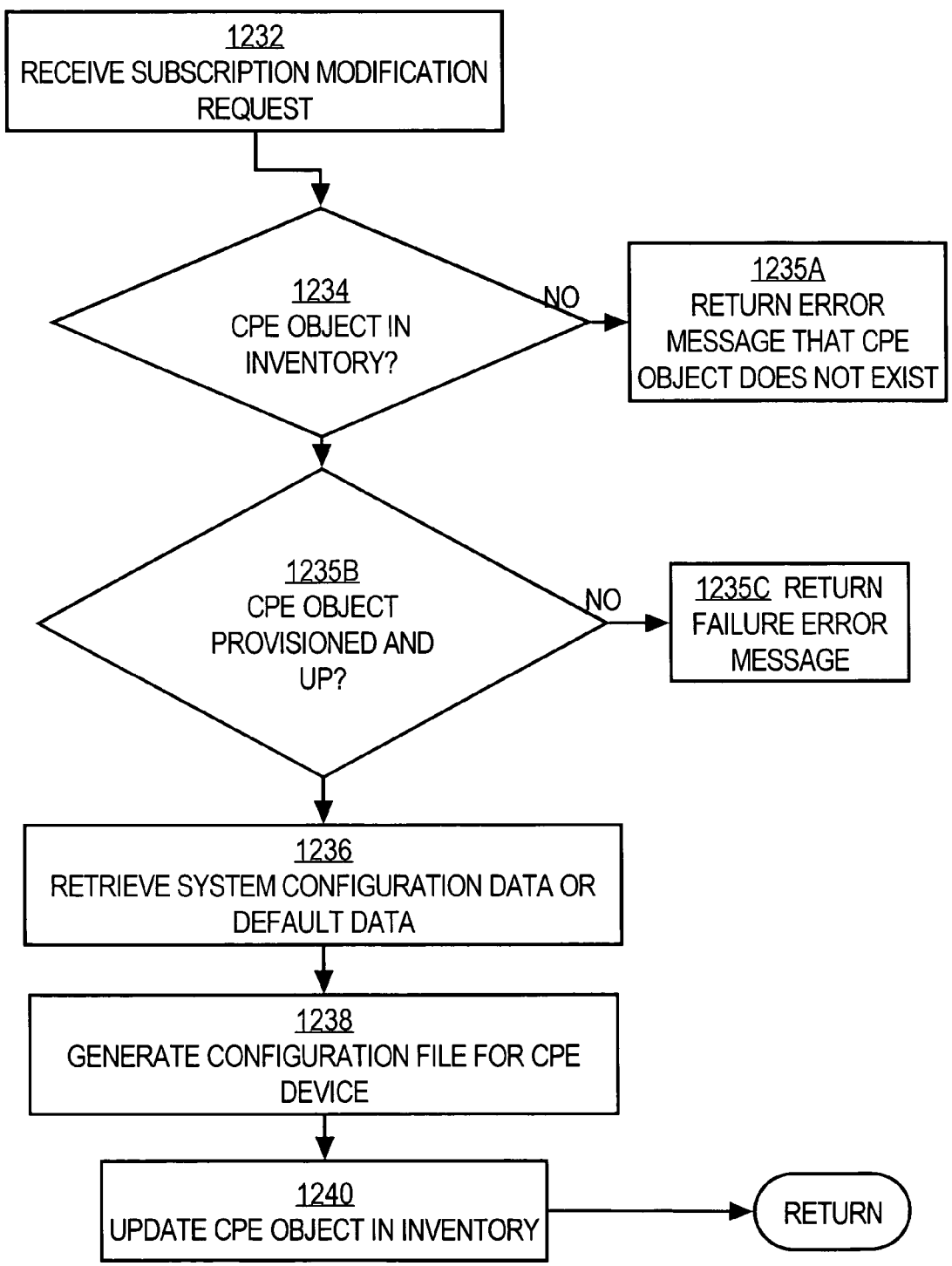
FIG. 12D is a flow diagram of other steps in a process of automatically provisioning a DSL CPE device.

Referring now to FIG. 12D, in block 1232, a subscription modification request is received. In one specific embodiment, the request includes values for Service type (modify voice service or data service), Operation (update), Subscriber ID (optional), Service request number (optional), device type and model, device name, Full path sub-network names (from root, e.g., region/site/central office/DSLAM Complex2) where the CPE resides, Template file for configure update (optional), Service attributes (used as input data for generating the configure file), and Template data (values of service provider defined variables in configure template file). Upon success, the subscription modification process returns a configuration file name and FTP server name.

In one specific embodiment, as shown by block 1234, the process of block 1232 involves determining whether a CPE object already exists in the Inventory of CPE configuration service 650. If not, at block 1235A, an error message is returned indicating that the CPE object does not exist. At block 1235B, the process checks whether the CPE object is in the "provisioned" state 906 and if its operational state is "up", If not, then an error message is returned indicating that the configuration update cannot be done, as shown by block 1235C.

In block 1236, system configuration data from the containing sub-networks is retrieved. If configuration data doesn't exist in the sub-networks, default configuration data is used.

In block 1238, a configuration file is generated for the CPE device. If the name of a template file is not given in the request, then the process retrieves a template file based on device type, operation type and service type. The process generates template data, derived from CPE object attributes and service attributes. If the configuration file is generated successfully, the configure update file is given a unique name. The configuration file is then sent to a file server, and overwrites any existing previous version of the update file.

In block 1240, the CPE object is updated in the Inventory of CPE configuration service 650, with values for Template file names, Service attributes, and Template data. The status of the above steps also is logged in the log file.

Figure 12E:
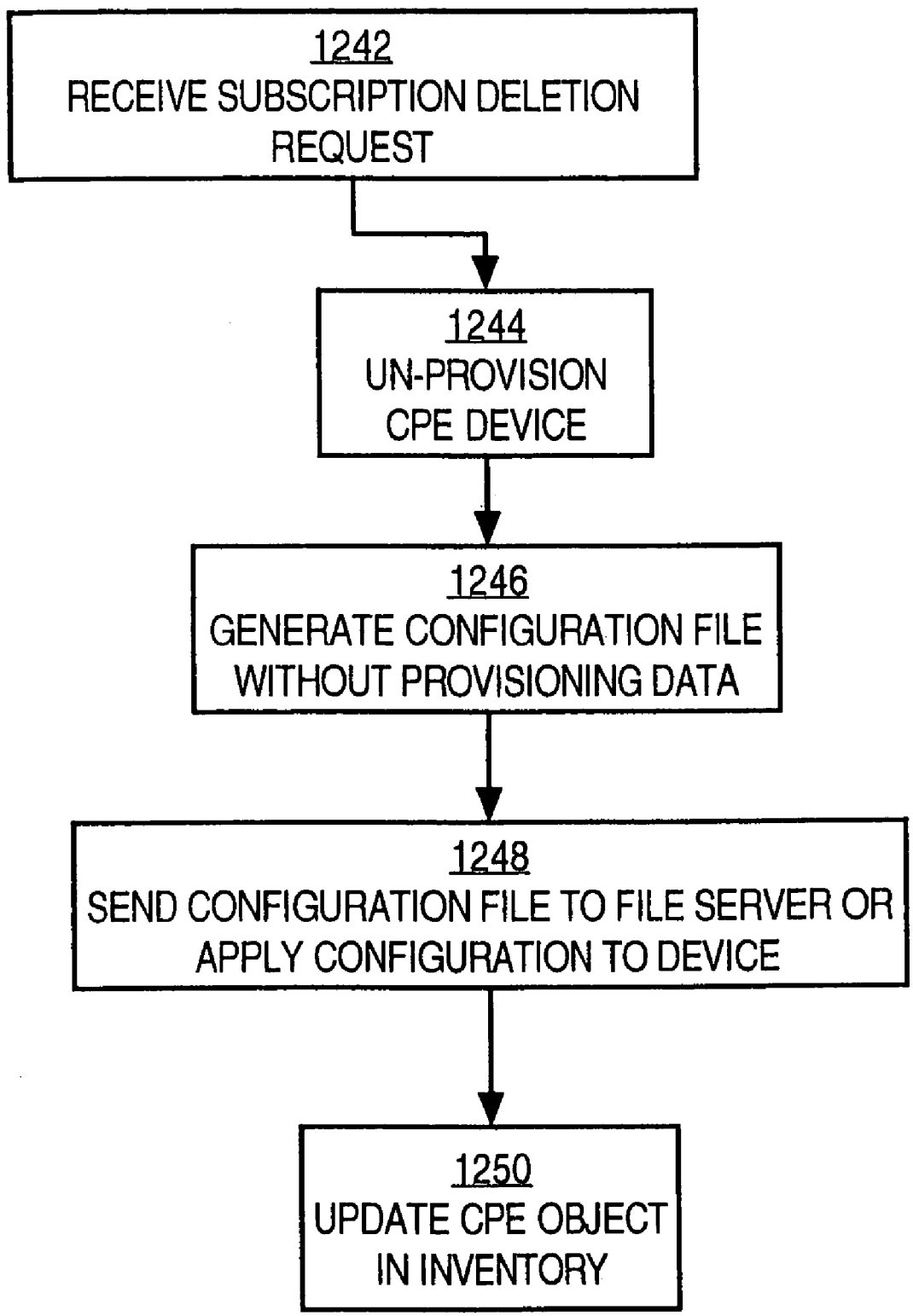
FIG. 12E is a flow diagram of other steps in a process of automatically provisioning a DSL CPE device.

Referring now to FIG. 12E, block 1242 involves processing a subscription deletion request. In one embodiment, the deletion request contains values for Service type: voice and data service deletion; Operation (deletion); Subscriber ID (optional); Service request number (optional); device type and model; device name; Full path sub-network names (from root, e.g., region/site/central office/DSLAM Complex2) where the CPE resides; Template file (optional); Template data (values of service provider defined variables in configure template file, optional).

In block 1244, the CPE device is un-provisioned using the steps shown in the succeeding blocks. In particular, in one specific embodiment, a test is carried out to determine whether the CPE object already exists in the Inventory of CPE configuration service 650. If not, an error message is returned indicating that the CPE object does not exist. Retrieve system configuration data from the containing sub-networks. If configuration data doesn't exist in the sub-networks, use default configuration.

In block 1246, a configuration file is generated. In one embodiment, if a template file is not given, then the process retrieves a template file based on device type, operation type and service type, and fills in the template data. The configure update file is given a unique name.

In block 1248, the configuration file is sent to the file server, and overwrites any existing previous update file. Alternatively, CPE configuration service 650 telnets to the device, using the signaling PVC for management, downloads the configure file, and applies the configuration. The configuration is applied by merging it to the running configuration. If the merge is successful, the merged configuration file becomes the start up configuration.

In block 1250, the CPE object is updated in the Inventory of CPE configuration service 650, with values for Template file name, Template data, and Provisioning state (Assigned). The status of the above steps also is logged in a log file.

Figure 12F:
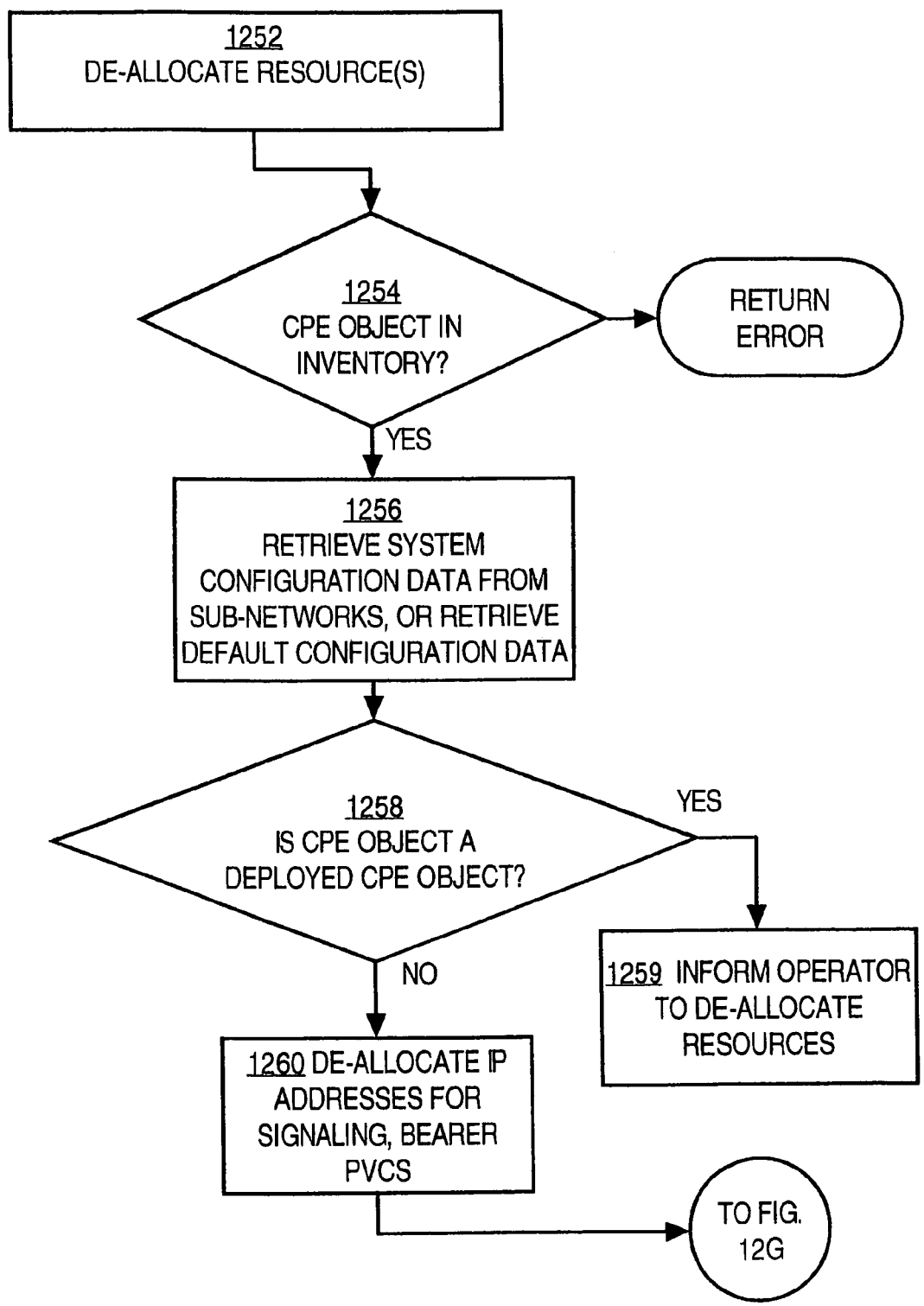
FIG. 12F is a flow diagram of other steps in a process of automatically provisioning a DSL CPE device.
Figure 12G:
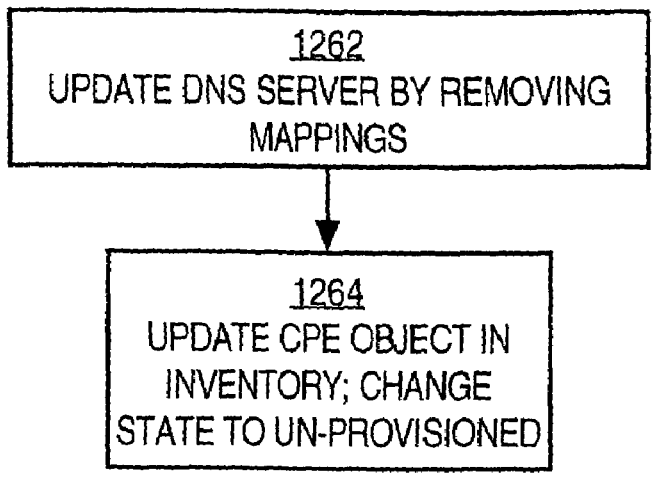
FIG. 12G is a flow diagram of other steps in a process of automatically provisioning a DSL CPE device.
Figure 12H:
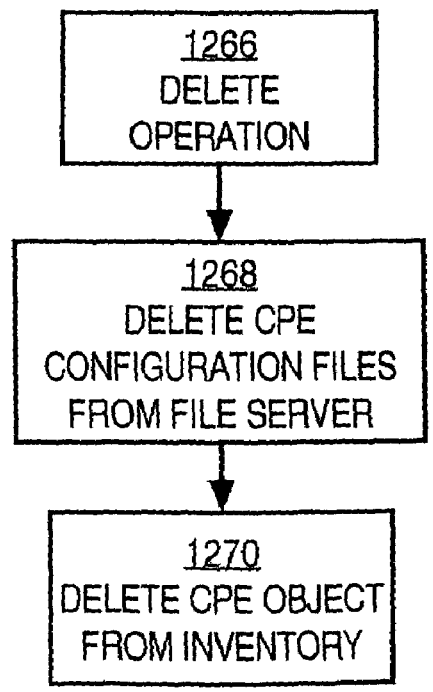
FIG. 12H is a flow diagram of other steps in a process of automatically provisioning a DSL CPE device.

Referring now to FIG. 12F, block 1252 illustrates initiation of a process to de-allocate a resource. In block 1254, CPE configuration service 650 tests whether a CPE object received as part of the request already exists in Inventory. If not, the service returns an error indicating that CPE object does not exist. In block 1256, the service retrieves system configuration data from the containing sub-networks. If configuration data doesn't exist in the sub-networks, a default configuration is used.

In block 1258, the service tests whether a CPE object has been introduced to the CPE configuration service 650 as a "deployed CPE" object. A deployed CPE object represents a CPE device that is initially configured outside of CPE configuration service 650 and introduced into CPE configuration service 650 for configure update purposes. If the object represents a deployed CPE device, then the process returns a success message indicating that it is the responsibility of the OSS or operator to de-allocate resources for the device, as shown by block 1259.

In block 1260, if IP addresses and FQDNs have been allocated by CPE configuration service 650, the IP addresses for signaling and bearer PVCs are de-allocated by communication with the DHCP server. In block 1262, the process updates the DNS server by removing mappings of (IP address, FQDN) from DNS. If the DNS update fails, an error is logged.

In block 1264, the CPE object in the Inventory is updated, with values for IP addresses and FQDNs for signaling and bearer PVCs, and Provisioning state as un-provisioned.

In block 1266, a Delete operation is carried out. Specifically, in one embodiment, in block 1268, the CPE configuration files are deleted from the FTP server. In block 1270, the CPE object is deleted from the CPE configuration service 650 Inventory. The status of these steps is logged in a log file to provide an audit trail.

The foregoing general processes are also applicable to T1 CPE devices. However, T1 CPE devices are configured through a pre-stage and configure update process. During pre-stage: the configuration file is generated by CPE configuration service 650 based on configuration templates, and downloaded to T1 CPE via the console port. During configuration update: configuration update can be applied via Telnet to the device. Further, although processes herein have been described in the context of ATM networks that use PVCs as signaling channels, embodiments are not limited to that context.

4.6 Audit Trail Log and Log Viewer

CPE configuration service 650 may maintain an Audit Trail Log that records all provisioning activities and status data. In one embodiment, the Audit Trail Log is stored in a database, and a GUI viewer is provided for viewing and sorting log records.

In one specific embodiment, each service request from OSS or service provider operator is logged in a log record. A unique service request number or subscriber ID is entered for a service request. The subscriber ID or service request number are logged, and can be used to sort or search the log records. A log record may contain the following fields User name (string, identifies the operator who performs the service request through the GUI); Server name (string, the provisioning server that serves the request); Log category (enum, one of these values: none, info); Source (string, contains service request number if given); Message (string, contains CPE name, operation, operation status etc.); Date time (string, in the format "yyyy/MM/dd HH::mm::ss" in GMT); Host name (string, identifies the client host where operator logs in); External Tag (string, used to identify subscriber ID if given).

According to one specific embodiment, the log viewer enables log records to be sorted by date, server name, source (service request number), user, external tag (subscriber ID), and category. Further, log records can be searched and displayed by a range of dates, server name, source (service request number), user, external tag (subscriber ID), or log category.

5.0 Hardware Overview

Figure 13:
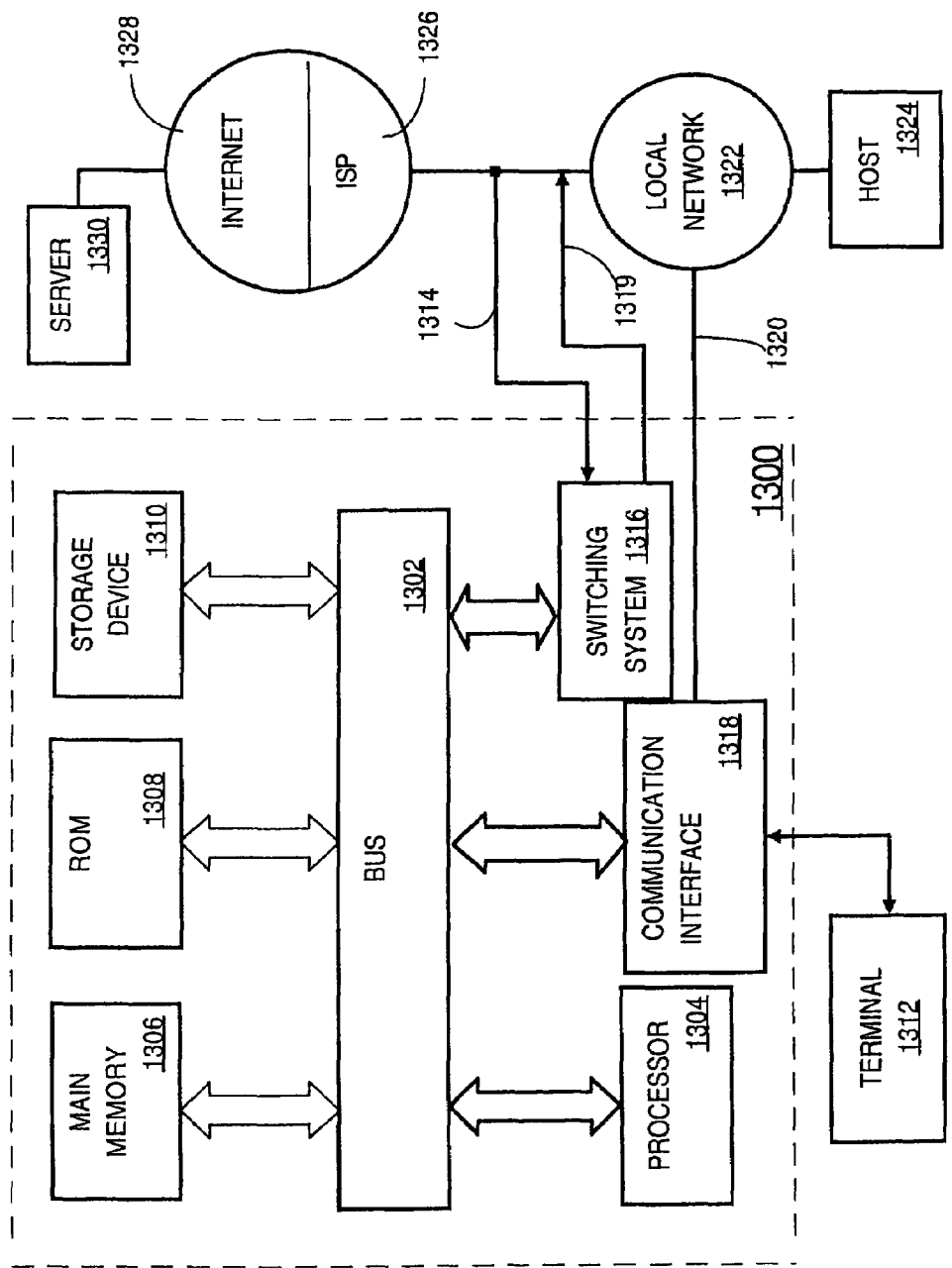
FIG. 13 is a block diagram that illustrates a computer system upon which an embodiment may be implemented.

FIG. 13 is a block diagram that illustrates a computer system 1300 upon which an embodiment of the invention may be implemented. The preferred embodiment is implemented using one or more computer programs running on a network element such as a router device. Thus, in this embodiment, the computer system 1300 is a router.

Computer system 1300 includes a bus 1302 or other communication mechanism for communicating information, and a processor 1304 coupled with bus 1302 for processing information. Computer system 1300 also includes a main memory 1306, such as a random access memory (RAM), flash memory, or other dynamic storage device, coupled to bus 1302 for storing information and instructions to be executed by processor 1304. Main memory 1306 also may be used for storing temporary variables or other intermediate information during execution of instructions to be executed by processor 1304. Computer system 1300 further includes a read only memory (ROM) 1308 or other static storage device coupled to bus 1302 for storing static information and instructions for processor 1304. A storage device 1310, such as a magnetic disk, flash memory or optical disk, is provided and coupled to bus 1302 for storing information and instructions.

An communication interface 1318 may be coupled to bus 1302 for communicating information and command selections to processor 1304. Interface 1318 is a conventional serial interface such as an RS-232 or RS-422 interface. An external terminal 1312 or other computer system connects to the computer system 1300 and provides commands to it using the interface 1314. Firmware or software running in the computer system 1300 provides a terminal interface or character-based command interface so that external commands can be given to the computer system.

A switching system 1316 is coupled to bus 1302 and has an input interface 1314 and an output interface 1319 to one or more external network elements. The external network elements may include a local network 1322 coupled to one or more hosts 1324, or a global network such as Internet 1328 having one or more servers 1330. The switching system 1316 switches information traffic arriving on input interface 1314 to output interface 1319 according to pre-determined protocols and conventions that are well known. For example, switching system 1316, in cooperation with processor 1304, can determine a destination of a packet of data arriving on input interface 1314 and send it to the correct destination using output interface 1319. The destinations may include host 1324, server 1330, other end stations, or other routing and switching devices in local network 1322 or Internet 1328.

The invention is related to the use of computer system 1300 for automating customer premises equipment provisioning in a telecommunications network. According to one embodiment of the invention, automating customer premises equipment provisioning in a telecommunications network is provided by computer system 1300 in response to processor 1304 executing one or more sequences of one or more instructions contained in main memory 1306. Such instructions may be read into main memory 1306 from another computer-readable medium, such as storage device 1310. Execution of the sequences of instructions contained in main memory 1306 causes processor 1304 to perform the process steps described herein. One or more processors in a multi-processing arrangement may also be employed to execute the sequences of instructions contained in main memory 1306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any storage medium that participates in providing instructions to processor 1304 for execution. Such a medium may take many forms, including but not limited to, non-volatile media, and volatile media. Non-volatile media includes, for example, optical or magnetic disks, such as storage device 1310. Volatile media includes dynamic memory, such as main memory 1306.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 1304 for execution. For example, the instructions may initially be carried on a magnetic disk of a remote computer. The remote computer can load the instructions into its dynamic memory and send the instructions over a telephone line using a modem. A modem local to computer system 1300 can receive the data on the telephone line and use an infrared transmitter to convert the data to an infrared signal. An infrared detector coupled to bus 1302 can receive the data carried in the infrared signal and place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Communication interface 1318 also provides a two-way data communication coupling to a network link 1320 that is connected to a local network 1322. For example, communication interface 1318 may be an integrated services digital network (ISDN) card or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are exemplary forms of carrier waves transporting the information.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318. In accordance with the invention, one such downloaded application provides for automatically provisioning customer premises equipment devices in a telecommunications network as described herein.

The received code may be executed by processor 1304 as it is received, and/or stored in storage device 1310, or other non-volatile storage for later execution. In this manner, computer system 1300 may obtain application code in the form of a carrier wave.

6.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of provisioning a next generation telecommunications network to provide network services, comprising:
receiving a service request that specifies a service to be provided to customer premises equipment in the next generation network;
creating and storing information that represents a logical decomposition of the next generation network into a plurality of discrete functional areas;
analyzing the information representing the functional areas to identify one or more provisioning requirements for each of the functional areas;
defining one or more provisioning procedures and identifying one or more tools based on the provisioning requirements;
creating and storing a provisioning plan that includes a sequenced execution of the defined procedures and identified tools;
executing the procedures and tools in the provisioning plan in the sequence identified therein to provision the next generation network to provide the specified service.

2. The method as recited in claim 1, wherein the service request identifies a desired service and service attributes.

3. The method as recited in claim 2, wherein the service request identifies customer services equipment to be provisioned to provide the desired service.

4. The method as recited in claim 2, wherein the service request is received from an order service system controlled by a service provider of the desired service.

5. The method as recited in claim 1, wherein the order service system is notified that the desired service has been provisioned.

6. The method as recited in claim 1, further comprising logically partitioning the next generation network into a subscriber customer premises equipment area, an access network and core network area, and a switch and other processors area.

7. The method as recited in claim 6, further comprising identifying one or more network devices that are involved in each of the functional areas, and for each of the identified devices, determining a setup that is required to enable the identified devices to inter-communicate to provide services to subscribers.

8. The method as recited in claim 7, further comprising determining one or more boundaries of the discrete functional areas based on classifying the devices according to functions performed by the devices in delivering network services.

9. The method as recited in claim 7, further comprising determining one or more boundaries of the discrete functional areas based on classifying the devices according to roles and responsibilities performed by the devices in delivering network services.

10. The method as recited in claim 7, further comprising defining one or more individual device settings for the setup, and storing the individual device settings in a database.

11. The method as recited in claim 7, wherein creating and storing a provisioning plan includes analyzing and resolving one or more inter-dependencies of procedures applicable to subscriber customer premises equipment devices, access and core network devices, and switches or other processors.

12. The method as recited in claim 1, wherein executing the procedures and tools in the provisioning plan additionally comprises the steps of sending one or more commands, data or other information to devices in the next generation network.

13. The method as recited in claim 1, wherein the service request comprises a request to update provisioning of customer premises equipment.

14. An apparatus for provisioning a next generation network to provide network services, the apparatus comprising:
one or more processors;
a network communicatively coupled to the processors and configured to communicate one or more packet flows among the processors and a network; and
a computer readable storage medium comprising one or more sequences of instructions for provisioning a next generation network, which instructions, when executed by one or more processors, cause the one or more processors to perform:
receiving a service request that specifies a service to be provided to customer premises equipment in the next generation network;
creating and storing information that represents a logical decomposition of the next generation network into a plurality of discrete functional areas;
analyzing the information representing the functional areas to identify one or more provisioning requirements for each of the functional areas;
defining one or more provisioning procedures and identifying one or more tools based on the provisioning requirements;
creating and storing a provisioning plan that includes a sequenced execution of the defined procedures and identified tools;
executing the procedures and tools in the provisioning plan in the sequence identified therein to provision the next generation network to provide the specified service.

15. A computer-readable storage medium encoded with one or more sequences of computer-executable instructions for provisioning network service in a next generation telecommunications network, which instructions, when executed by one or more processors, cause the one or more processors to carry out the steps of: receiving a service request that specifies a service to be provided to customer premises equipment in the next generation network; creating and storing information that represents a logical decomposition of the next generation network into a plurality of discrete functional areas; analyzing the information representing the functional areas to identify one or more provisioning requirements for each of the functional areas; defining one or more provisioning procedures and identifying one or more tools based on the provisioning requirements; creating and storing a provisioning plan that includes a sequenced execution of the defined procedures and identified tools; executing the procedures and tools in the provisioning plan in the sequence identified therein to provision the next generation network to provide the specified service.

16. A next generation network telecommunications system comprising logical discrete functional areas of:
a subscriber customer premises equipment area comprising one or more customer premises equipment devices that deliver services to a subscriber;
an access network and core network area comprising one or more network devices at access edge and core that provide connectivity to subscriber customer premises equipment devices; and
a switch and other processors area comprising one or more next generation network components that provide network services;
said next generation network telecommunications system additionally comprising:
an electronic memory coupled to one or more processors;
one or more stored program instructions stored in the memory, which, when executed by the one or more processors, cause the one or more processors to perform the steps of:
receiving a service request that specifies a service to be provided to customer premises equipment in the next generation network;
creating and storing information that represents a logical decomposition of the next generation network into a plurality of discrete functional areas;
analyzing the information representing the functional areas to identify one or more provisioning requirements for each of the functional areas;
defining one or more provisioning procedures and identifying one or more tools based on the provisioning requirements;
creating and storing a provisioning plan that includes a sequenced execution of the defined procedures and identified tools;
executing the procedures and tools in the provisioning plan in the sequence identified therein to provision the next generation network to provide the specified service.

17. The system of claim 16, wherein a function performed by a device when delivering network services determines to which logical discrete functional area the device belongs.

18. The system of claim 16, wherein the one or more stored program instructions stored in the memory cause the one or more processors to perform, for each device in each logical discrete functional area, determining a setup that is required to enable the device to inter-communicate with other devices in the next generation network to provide services to the subscriber.

19. The system of claim 18, wherein the one or more stored program instructions that cause the processor to perform the step of determining a setup that is required to enable a device to inter-communicate comprises instructions that cause the one or more processors to perform defining one or more individual device settings for the setup and storing the individual device settings in a database.

20. The system of claim 16, wherein the one or more stored program instructions that cause the processor to perform the step of defining one or more provisioning procedures and identifying one or provisioning tools comprises instructions that cause the one or more processors to perform identifying one or more of an Element Management System, Dynamic Host Configuration Protocol server, and Domain Name System server.

21. The system of claim 16, wherein the one or more stored program instructions that cause the processor to perform the step of creating a provisioning plan comprises instructions that cause the one or more processors to perform analyzing and resolving one or more inter-dependencies of procedures applicable to devices in each logical functional area.

22. The apparatus of claim 14, wherein the service request identifies a desired service and service attributes.

23. The apparatus of claim 22, wherein the service request identifies customer services equipment to be provisioned to provide the desired service.

24. The apparatus of claim 22, wherein the service request is received from an order service system controlled by a service provider of the desired service.

25. The apparatus of claim 14, wherein the order service system is notified that the desired service has been provisioned.

26. The apparatus of claim 14, wherein the program instructions include instructions which, when executed by the one or more processors, cause the one or more processors to perform the step of logically partitioning the next generation network into a subscriber customer premises equipment area, an access network and core network area, and a switch and other processors area.

27. The apparatus of claim 26, wherein the program instructions include instructions which, when executed by the one or more processors, cause the one or more processors to perform the steps of identifying one or more network devices that are involved in each of the functional areas, and for each of the identified devices, determining a setup that is required to enable the identified devices to inter-communicate to provide services to subscribers.

28. The apparatus of claim 27, wherein the program instructions include instructions which, when executed by the one or more processors, cause the one or more processors to perform the step of determining one or more boundaries of the discrete functional areas based on classifying the devices according to functions performed by the devices in delivering network services.

29. The apparatus of claim 27, wherein the program instructions include instructions which, when executed by the one or more processors, cause the one or more processors to perform the step of determining one or more boundaries of the discrete functional areas based on classifying the devices according to roles and responsibilities performed by the devices in delivering network services.

30. The apparatus of claim 27, wherein the program instructions include instructions which, when executed by the one or more processors, cause the one or more processors to perform the step of defining one or more individual device settings for the setup, and storing the individual device settings in a database.

31. The apparatus of claim 27, wherein the program instructions which, when executed by the one or more processors, cause the one or more processors to perform the steps of creating and storing a provisioning plan include instructions which, when executed by the one or more processors, cause the one or more processors to perform the steps of: analyzing and resolving one or more inter-dependencies of procedures applicable to subscriber customer premises equipment devices, access and core network devices, and switches or other processors.

32. The apparatus of claim 14, wherein the program instructions which, when executed by the one or more processors, cause the one or more processors to perform the step of executing the procedures and tools in the provisioning plan additionally comprise program instructions which, when executed by the one or more processors, cause the one or more processors to perform the step of sending one or more commands, data or other information to devices in the next generation network.

33. The apparatus of claim 14, wherein the service request comprises a request to update provisioning of customer premises equipment.

* * * * *